US012654742B2

(12) United States Patent
Mahadevan et al.

(10) Patent No.: US 12,654,742 B2
(45) Date of Patent: Jun. 16, 2026

(54) DRIVER ASSISTANCE DATA INCLUDING COLLECTIVE BEHAVIOR ASSESSMENTS OF TRAFFIC SEGMENTS

(71) Applicant: QUALCOMM Incorporated, San Diego, CA (US)

(72) Inventors: Shabin Mahadevan, Lake Orion, MI (US); Annika Larsson, Mölndal (SE)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 18/594,329

(22) Filed: Mar. 4, 2024

(65) Prior Publication Data

US 2025/0276718 A1 Sep. 4, 2025

(51) Int. Cl.
    *B60W 60/00*     (2020.01)
    *G08G 1/01*     (2006.01)
    *G08G 1/0967*     (2006.01)

(52) U.S. Cl.
    CPC ....... *B60W 60/0011* (2020.02); *G08G 1/0112* (2013.01); *G08G 1/0141* (2013.01); *G08G 1/096791* (2013.01); *B60W 2554/4046* (2020.02); *B60W 2554/408* (2020.02); *B60W 2556/65* (2020.02)

(58) Field of Classification Search
    CPC ............. B60W 60/0011; G08G 1/0112; G08G 1/0141; G08G 1/096791
    See application file for complete search history.

(56) References Cited

U.S. PATENT DOCUMENTS

2014/0278032 A1* 9/2014 Scofield ............... G08G 1/0129
    701/118
2016/0057335 A1* 2/2016 Pisz ................. G08G 1/096775
    348/149

(Continued)

FOREIGN PATENT DOCUMENTS

| EP | 4270352 A1 | 11/2023 |
| WO | WO-2014131772 A1 | 9/2014 |
| WO | WO-2023187718 A1 | 10/2023 |

OTHER PUBLICATIONS

International Search Report and Written Opinion—PCT/US2025/013421—ISA/EPO—May 8, 2025.

*Primary Examiner* — Hunter B Lonsberry

(74) *Attorney, Agent, or Firm* — Muncy, Geissler, Olds & Lowe, P.C.

(57) ABSTRACT

Disclosed are related to driver assistance technologies. In an aspect, a server device may receive, from each reporting vehicle of one or more reporting vehicles interacting with one or more traffic segments, a corresponding set of parameters. The server device may determine an individual behavior assessment for each vehicle interacting with respective one of the one or more traffic segments based on the corresponding set of parameters; and determine a collective behavior assessment for each traffic segment of the one or more traffic segments based on one or more individual behavior assessments associated with the corresponding traffic segment and configuration information of the corresponding traffic segment. The server device may transmit driver assistance data to a subscribing vehicle, where the driver assistance data may include at least the one or more collective behavior assessments of the one or more traffic segments.

20 Claims, 11 Drawing Sheets

700

710 Receive, from each reporting vehicle of one or more reporting vehicles interacting with one or more traffic segments, a corresponding set of parameters 720 Determine an individual behavior assessment for each vehicle interacting with respective one of the one or more traffic segments based on the corresponding set of parameters 730 Determine a collective behavior assessment for each traffic segment of the one or more traffic segments based on one or more individual behavior assessments associated with the corresponding traffic segment and configuration information of the corresponding traffic segment 740 Transmit driver assistance data to a subscribing vehicle, the driver assistance data including at least the one or more collective behavior assessments of the one or more traffic segments

(56) References Cited

U.S. PATENT DOCUMENTS

| | | | | |
|---|---|---|---|---|
| 2017/0069208 A1* | 3/2017 | Nair | .................. | G01C 21/3602 |
| 2017/0309171 A1* | 10/2017 | Zhao | ............... | G08G 1/096838 |
| 2020/0050209 A1* | 2/2020 | Bai | ................... | B60K 31/0058 |
| 2020/0064846 A1* | 2/2020 | Chen | ............... | G08G 1/096791 |
| 2020/0125117 A1* | 4/2020 | Switkes | ............... | H04W 4/029 |
| 2022/0176986 A1* | 6/2022 | Lei | ..................... | B60W 60/001 |
| 2023/0306457 A1 | 9/2023 | Ramirez et al. | | |

* cited by examiner

100

Server
Device
108

128

Network
120

Network Transceiver(s)

Driver Assistance Component

298

Data Bus

292

Memory

Driver Assistance Component

Driver Assistance Component

Processor(s)

Driver Assistance Component

294

296          298                    298                    298

400B

460

500A

510

Route Planning
Process

Route,
Time Headway,
Aggressiveness

530

Current Location          512

Destination          514

Collective Behavior
Assessment(s)          516

Capability of the
Vehicle          522

Driver's Engagement
Type or Level          524

Driver's Preferences          526

600

610

512 Current Location

530 Route, Time Headway, Aggressiveness

Driving Parameter Configuring Process

516 Collective Behavior Assessment(s)

522 Capability of the Vehicle

524 Driver's Engagement Level

526 Driver's Preferences

Parameters of ADAS and/or ADS of the vehicle

630

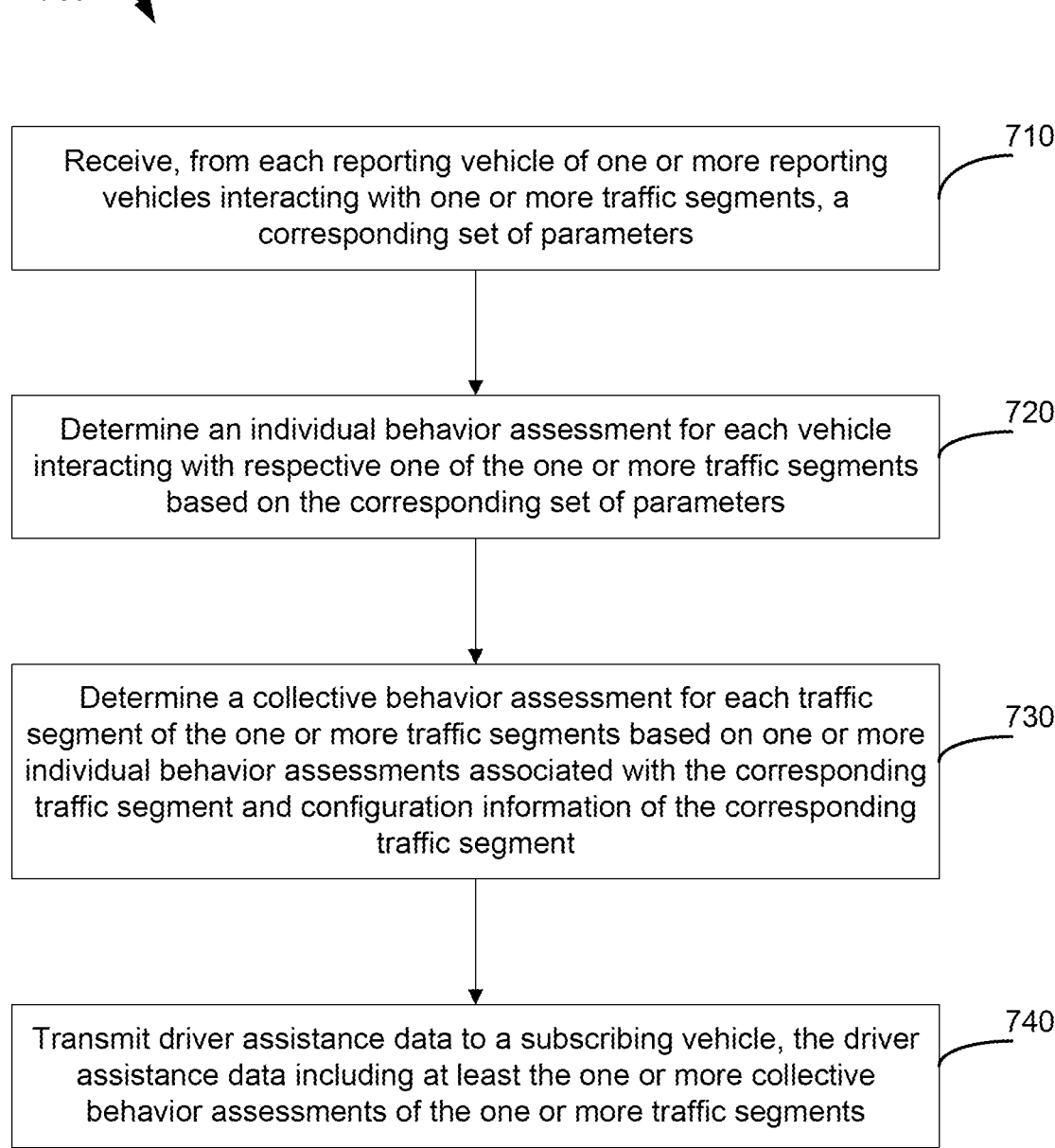

700

Receive, from each reporting vehicle of one or more reporting vehicles interacting with one or more traffic segments, a corresponding set of parameters
710

Determine an individual behavior assessment for each vehicle interacting with respective one of the one or more traffic segments based on the corresponding set of parameters
720

Determine a collective behavior assessment for each traffic segment of the one or more traffic segments based on one or more individual behavior assessments associated with the corresponding traffic segment and configuration information of the corresponding traffic segment
730

Transmit driver assistance data to a subscribing vehicle, the driver assistance data including at least the one or more collective behavior assessments of the one or more traffic segments
740

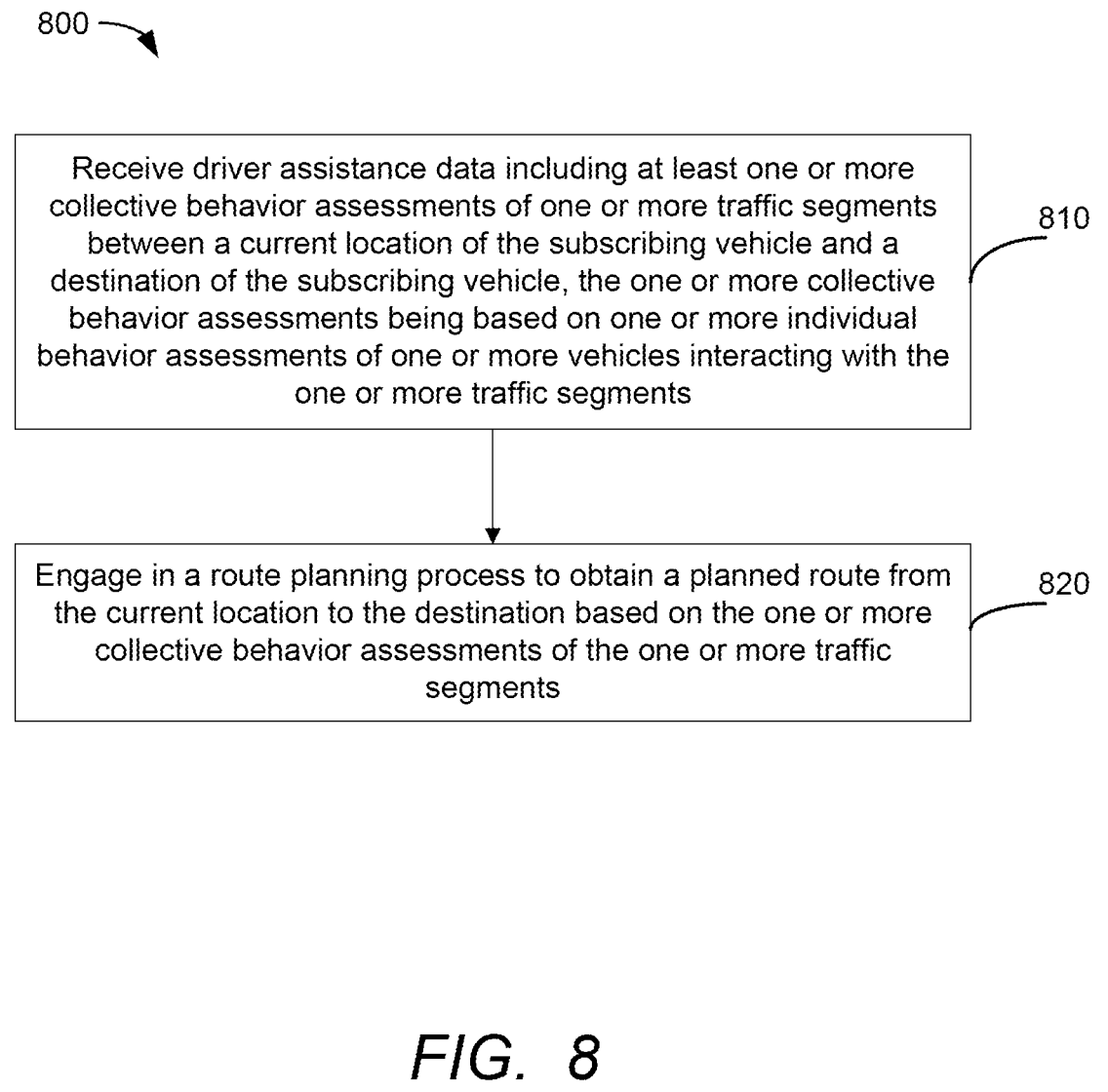

Receive driver assistance data including at least one or more collective behavior assessments of one or more traffic segments between a current location of the subscribing vehicle and a destination of the subscribing vehicle, the one or more collective behavior assessments being based on one or more individual behavior assessments of one or more vehicles interacting with the one or more traffic segments    810

Engage in a route planning process to obtain a planned route from the current location to the destination based on the one or more collective behavior assessments of the one or more traffic segments    820

*FIG. 8*

DRIVER ASSISTANCE DATA INCLUDING COLLECTIVE BEHAVIOR ASSESSMENTS OF TRAFFIC SEGMENTS

BACKGROUND OF THE DISCLOSURE

1. Field of the Disclosure

Aspects of the disclosure relate generally to driver assistance technologies.

2. Description of the Related Art

Modern motor vehicles are increasingly incorporating technology that helps drivers to obtain a planned route for navigation from a current location to a destination (e.g., an automotive navigation system), to avoid drifting into adjacent lanes or making unsafe lane changes (e.g., lane departure warning (LDW)), to be warned about the presence of another vehicle behind a current vehicle when backing up, or to be assisted with automatic braking if another vehicle ahead of the current vehicle stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention.

There are six levels of driving automation that have been defined to achieve full automation. At Level 0, the human driver does all the driving. At Level 1, an advanced driver assistance system (ADAS) on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human driver or occupants need not pay attention in those circumstances. At Level 5, an ADS on the vehicle can do all the driving in all circumstances. The human occupants are just passengers and need never be involved in driving.

In order to better assist the driver, the ADAS, or the ADS of a vehicle, there is a need to accurately and efficiently collect and/or provide driver assistance data regarding the traffic segments that the vehicle may use or is using.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a server device includes receiving, from each reporting vehicle of one or more reporting vehicles interacting with one or more traffic segments, a corresponding set of parameters; determining an individual behavior assessment for each vehicle interacting with respective one of the one or more traffic segments based on the corresponding set of parameters; determining a collective behavior assessment for each traffic segment of the one or more traffic segments based on one or more individual behavior assessments associated with the corresponding traffic segment and configuration information of the corresponding traffic segment; and transmitting driver assistance data to a subscribing vehicle, the driver assistance data including at least the one or more collective behavior assessments of the one or more traffic segments.

In an aspect, a method of operating a processing device of a subscribing vehicle includes receiving driver assistance data including at least one or more collective behavior assessments of one or more traffic segments between a current location of the subscribing vehicle and a destination of the subscribing vehicle, the one or more collective behavior assessments being based on one or more individual behavior assessments of one or more vehicles interacting with the one or more traffic segments; and engaging in a route planning process to obtain a planned route from the current location to the destination based on the one or more collective behavior assessments of the one or more traffic segments.

In an aspect, a server device includes one or more memories; one or more transceivers; and one or more processors communicatively coupled to the one or more memories and the one or more transceivers, the one or more processors, either alone or in combination, configured to: receive, via the one or more transceivers, from each reporting vehicle of one or more reporting vehicles interacting with one or more traffic segments, a corresponding set of parameters; determine an individual behavior assessment for each vehicle interacting with respective one of the one or more traffic segments based on the corresponding set of parameters; determine a collective behavior assessment for each traffic segment of the one or more traffic segments based on one or more individual behavior assessments associated with the corresponding traffic segment and configuration information of the corresponding traffic segment; and transmit, via the one or more transceivers, driver assistance data to a subscribing vehicle, the driver assistance data including at least the one or more collective behavior assessments of the one or more traffic segments.

In an aspect, a processing device of a subscribing vehicle includes one or more memories; one or more transceivers; and one or more processors communicatively coupled to the one or more memories and the one or more transceivers, the one or more processors, either alone or in combination, configured to: receive, via the one or more transceivers, driver assistance data including at least one or more collective behavior assessments of one or more traffic segments between a current location of the subscribing vehicle and a destination of the subscribing vehicle, the one or more collective behavior assessments being based on one or more individual behavior assessments of one or more vehicles interacting with the one or more traffic segments; and engage in a route planning process to obtain a planned route from the current location to the destination based on the one or more collective behavior assessments of the one or more traffic segments.

In an aspect, a server device includes means for receiving, from each reporting vehicle of one or more reporting vehicles interacting with one or more traffic segments, a corresponding set of parameters; means for determining an individual behavior assessment for each vehicle interacting with respective one of the one or more traffic segments based on the corresponding set of parameters; means for determining a collective behavior assessment for each traffic segment of the one or more traffic segments based on one or more individual behavior assessments associated with the corresponding traffic segment and configuration information of the corresponding traffic segment; and means for transmitting driver assistance data to a subscribing vehicle, the driver assistance data including at least the one or more collective behavior assessments of the one or more traffic segments.

In an aspect, a processing device of a subscribing vehicle includes means for receiving driver assistance data including at least one or more collective behavior assessments of one or more traffic segments between a current location of the subscribing vehicle and a destination of the subscribing vehicle, the one or more collective behavior assessments being based on one or more individual behavior assessments of one or more vehicles interacting with the one or more traffic segments; and means for engaging in a route planning process to obtain a planned route from the current location to the destination based on the one or more collective behavior assessments of the one or more traffic segments.

In an aspect, a non-transitory computer-readable medium stores computer-executable instructions that, when executed by a server device, cause the server device to: receive, from each reporting vehicle of one or more reporting vehicles interacting with one or more traffic segments, a corresponding set of parameters; determine an individual behavior assessment for each vehicle interacting with respective one of the one or more traffic segments based on the corresponding set of parameters; determine a collective behavior assessment for each traffic segment of the one or more traffic segments based on the one or more individual behavior assessments associated with the corresponding traffic segment and configuration information of the corresponding traffic segment; and transmit driver assistance data to a subscribing vehicle, the driver assistance data including at least the one or more collective behavior assessments of the one or more traffic segments.

In an aspect, a non-transitory computer-readable medium stores computer-executable instructions that, when executed by a processing device of a subscribing vehicle, cause the processing device to: receive driver assistance data including at least one or more collective behavior assessments of one or more traffic segments between a current location of the subscribing vehicle and a destination of the subscribing vehicle, the one or more collective behavior assessments being based on one or more individual behavior assessments of one or more vehicles interacting with the one or more traffic segments; and engage in a route planning process to obtain a planned route from the current location to the destination based on the one or more collective behavior assessments of the one or more traffic segments.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 1 illustrates an example operating environment for vehicles to exchange information using wireless techniques, according to aspects of the disclosure.

FIG. 7 is a flowchart illustrating an example method of operating a server device, according to aspects of the disclosure.

FIG. 8 is a flowchart illustrating an example method of operating a processing device of a subscribing vehicle, according to aspects of the disclosure.

DETAILED DESCRIPTION

Figure 2A:
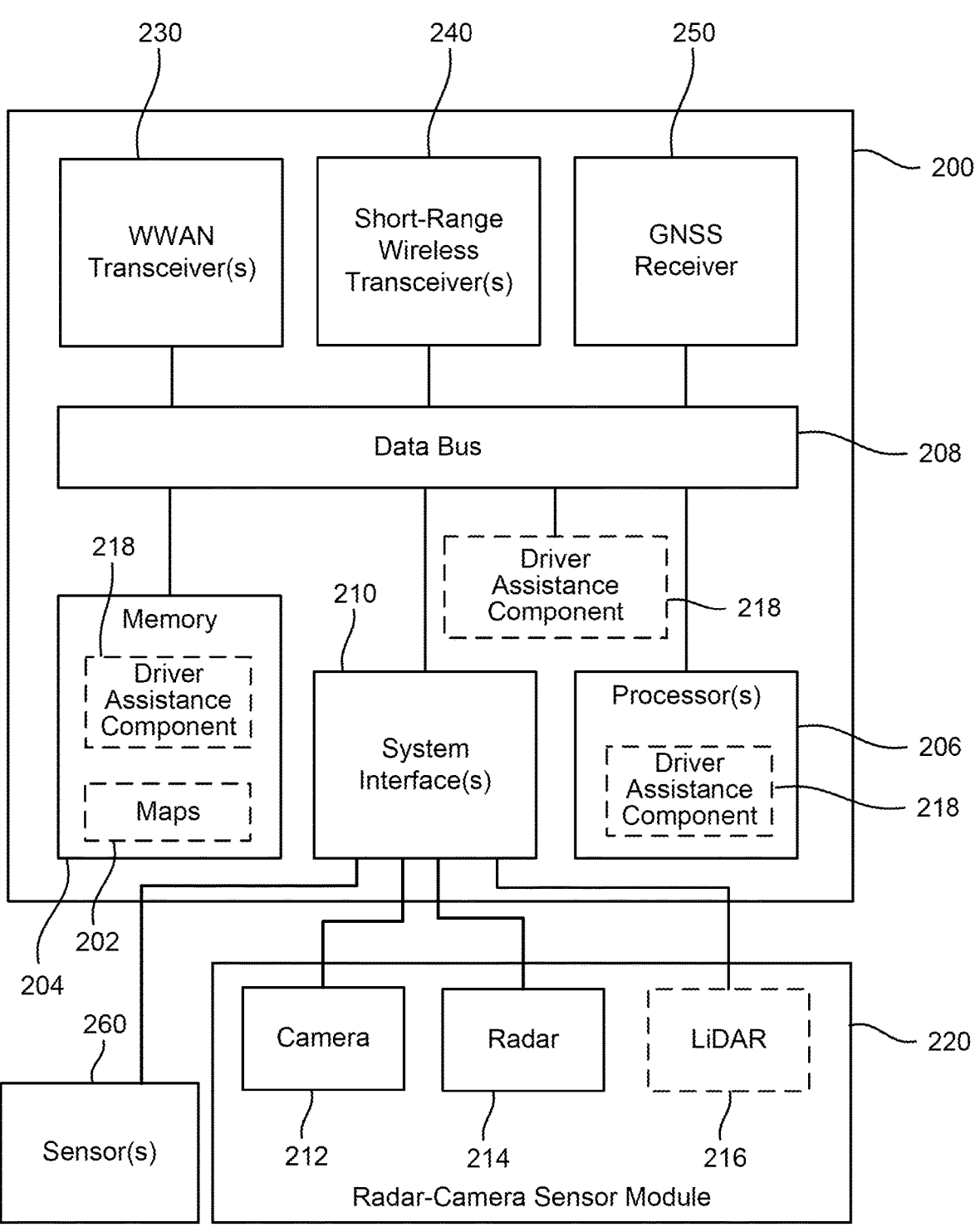
FIG. 2A is a simplified block diagram of an example processing device and various other components onboard a vehicle, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to driver assistance technologies. Some aspects more specifically relate to determining by a server device collective behavior assessments of traffic segments based on individual behavior assessments of vehicles interacting with the traffic segments, which are further based on parameters reported by one or more reporting vehicles. Some aspects more specifically relate to receiving by a subscribing vehicle from a server device driver assistance data that includes at least collective behavior assessments of traffic segments.

Particular aspects of the subject matter described in this disclosure can be implemented to realize one or more of the following potential advantages. In some examples, by determining collective behavior assessments of traffic segments based on individual behavior assessments of vehicles interacting with the traffic segments, the described techniques can be used to offer a subscribing vehicle the dynamically updated information regarding whether a particular traffic segment is nice, friendly, or safe in view of the behavior of other vehicles interacting with the traffic segment. In some examples, by receiving collective behavior assessments of traffic segments, the described techniques can be used to allow a subscribing vehicle to obtain the information regarding whether a particular traffic segment is nice, friendly, or safe in view of the behavior of other vehicles interacting with the traffic segment and to operate the subscribing vehicle accordingly. In some aspects, the subscribing vehicle based on the obtained information described above may have a smoother ride with reduced energy/fuel consumption.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
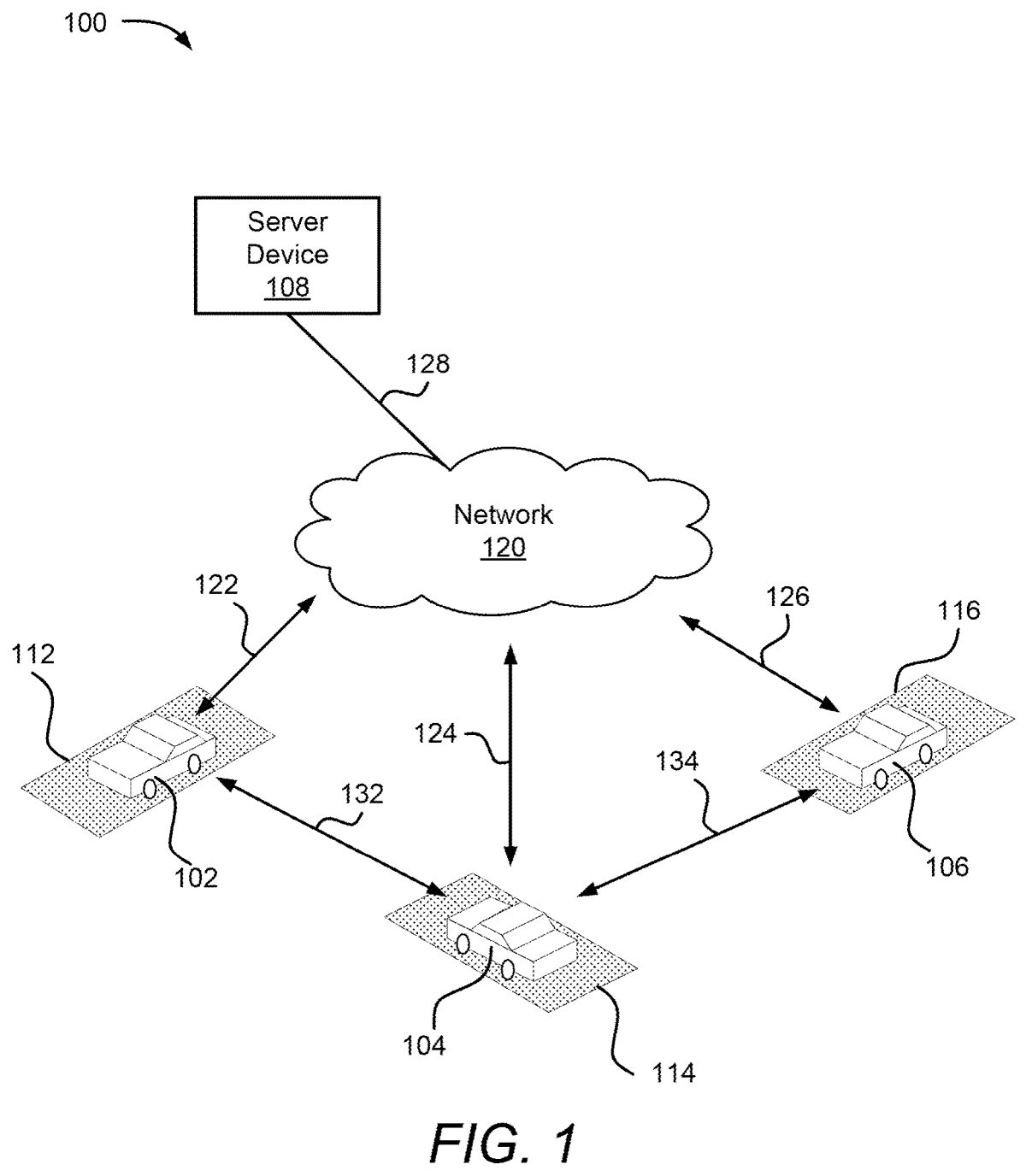

FIG. 1 illustrates an example operating environment 100 for vehicles (e.g., vehicles 102, 104, and 106) to exchange information among the vehicles and/or with a server device (e.g., server device 108) using wireless techniques, according to aspects of the disclosure. As shown in FIG. 1, the vehicles 102, 104, and 106 may interact with traffic segments 112, 114, and 116, respectively. Each one of the traffic segments 112, 114, and 116 may correspond to one or more road segments or route segments. In some aspects, a vehicle interacting with a traffic segment may correspond to the vehicle is travelling on, entering, and/or leaving the traffic segment. In some aspects, the vehicles 102, 104, and 106 may include a powered vehicle travelling on a road segment, a non-powered vehicle travelling on a road segment, or both. In some aspects, the powered vehicle may include an electrical-powered bicycle, a motorcycle, a passenger car, a van, a bus, a two-axle truck, a multi-axle truck, or the like.

In some aspects, the present disclosure uses vehicles travelling on road segments as the examples of vehicles and traffic segments for illustration purposes. In some aspects, the disclosed embodiments may be applicable to aerial vehicle travelling along aviation pathways or maritime vehicles travelling along maritime routes.

As shown in FIG. 1, the processing devices onboard the vehicles 102, 104, and 106 (e.g., on-board computers (OBCs)) may be communicatively coupled to a network 120 (e.g., depicted as communication paths 122, 124, and 126) based on a wireless communication technology, such as a wide area network (WWAN) including a Global System for Mobile communication (GSM) network, a fourth-generation (4G) network (e.g., Long Term Evolution (LTE) or WiMax), a fifth generation (5G) wireless network (also referred to as New Radio (NR)); or a short-range wireless network including Wi-Fi or BLUETOOTH®, and/or any suitable wireless network. Also, the server device 108 may be communicatively coupled to the network 120 (e.g., depicted as communication path 128) based on a wireless network or a wired network. Moreover, the processing devices onboard the vehicles 102, 104, and 106 may communicate with one another (e.g., depicted as communication path 132 between vehicles 102 and 104 and communication path 134 between vehicles 104 and 106) based on a wireless sidelink communication scheme. A wireless sidelink (or just "sidelink") is an adaptation of the core cellular (e.g., LTE, NR) standard that allows direct communication between two or more communication devices without the communication needing to go through a base station.

FIG. 2A is a simplified block diagram of an example processing device 200 and various other components onboard a vehicle, according to various aspects of the disclosure. In an aspect, the processing device 200 may be part of an advanced driver assistance system (ADAS) or an automated driving systems (ADS) of the vehicle (e.g., any of the vehicles 102, 104, and 106). For simplicity, various operations, acts, and/or functions are described herein as being performed "by a processing device onboard a vehicle" may also be referred to as performed "by an OBC," "by a vehicle," or the like in this disclosure.

The processing device 200 includes a non-transitory computer-readable storage medium, i.e., memory 204, and one or more processors 206 in communication with the memory 204 via a data bus 208. The memory 204 includes one or more storage modules storing computer-readable instructions executable by the one or more processors 206 to perform the functions of the processing device 200 described herein. For example, the one or more processors 206 in conjunction with the memory 204 may implement the various operations described herein.

One or more radar-camera sensor modules 220 are coupled to the processing device 200 (only one is shown in FIG. 2 for simplicity). In some aspects, the radar-camera sensor module 220 includes at least one camera 212, at least one radar 214, and an optional light detection and ranging (LiDAR) sensor 216. The processing device 200 also includes one or more system interfaces 210 connecting the one or more processors 206, by way of the data bus 208, to the radar-camera sensor module 220 and, optionally, other vehicle sub-systems (not shown).

In an aspect, the camera 212 may capture image frames (also referred to herein as camera frames) of the scene within the viewing area of the camera 212 at some periodic rate. Likewise, the radar 214 may capture radar frames of the scene within the viewing area of the radar 214 at some periodic rate. The periodic rates at which the camera 212 and the radar 214 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

The processing device 200 also includes, at least in some cases, one or more WWAN transceivers 230 configured to communicate via one or more wireless communication networks (not shown), such as an NR network, an LTE network, a GSM network, and/or the like. The one or more WWAN transceivers 230 may be connected to one or more antennas (not shown) for communicating with other network nodes, such as other processing devices onboard other vehicles, pedestrian user equipments (UEs), infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The one or more WWAN transceivers 230 may be variously configured for transmitting and encoding signals (e.g., messages, indications, information, and so on), and, conversely, for receiving and decoding signals (e.g., messages, indications, information, pilots, and so on) in accordance with the designated RAT.

The processing device 200 also includes, at least in some cases, one or more short-range wireless transceivers 240 (e.g., a Wi-Fi transceiver, a BLUETOOTH® transceiver, etc.). The one or more short-range wireless transceivers 240 may be connected to one or more antennas (not shown) for communicating with other network nodes, such as other processing devices onboard other vehicles, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The one or more short-range wireless transceivers 240 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include transmitter circuitry, receiver circuitry, or a combination thereof. A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. Wireless transmitter circuitry may include or be coupled to a plurality of antennas, such as an antenna array, that permits the respective apparatus (e.g., processing device 200) to perform transmit "beamforming," as described herein. Similarly, wireless receiver circuitry may include or be coupled to a plurality of antennas, such as an antenna array, that permits the respective apparatus (e.g., processing device 200) to perform receive beamforming, as described herein. In an aspect, the transmitter circuitry and receiver circuitry may share the same plurality of antennas, such that the respective apparatus can only receive or transmit at a given time, not both at the same time. A transceiver need not provide both transmit and receive functionalities in all designs. For example, a low functionality receiver circuit may be employed in some designs to reduce costs when providing full communication is not necessary (e.g., a receiver chip or similar circuitry simply providing low-level sniffing). A wireless transceiver (e.g., the one or more WWAN transceivers 230) may also include a network listen module (NLM) or the like for performing various measurements.

The processing device 200 also includes, at least in some cases, a global navigation satellite system (GNSS) receiver 250. The GNSS receiver 250 may be connected to one or more antennas (not shown) for receiving satellite signals. The GNSS receiver 250 may comprise any suitable hardware and/or software for receiving and processing GNSS signals. The GNSS receiver 250 requests information and operations as appropriate from the other systems, and performs the calculations necessary to determine the vehicle's position using measurements obtained by any suitable GNSS algorithm.

In an aspect, the processing device 200 may utilize the one or more WWAN transceivers 230 and/or the one or more short-range wireless transceivers 240 to download one or more maps 202 that can then be stored in memory 204 and used to obtain navigational map data for vehicle navigation. Map(s) 202 may be one or more HD maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by the vehicle. Map(s) 202 may also provide electronic horizon predictive awareness, which enables the vehicle to know what lies ahead. The information about the road lanes may include the number, width, type (e.g., high-occupancy vehicle (HOV) or non-HOV), traffic direction, etc. of the lanes. Alternatively, the map(s) 202 may be more generic, or compressed, with roadways represented as linear segments and/or road headings. Thus, the navigational map data obtainable from map(s) 202 may range from the locations and dimensions of stationary physical assets related to roadways and pathways to only road headings.

One or more sensors 260 of the vehicle may be coupled to the one or more processors 206 via the one or more system interfaces 210. In some aspects, the one or more sensors 260 may provide means for sensing or detecting information related to the state and/or environment of the vehicle, such as speed, heading (e.g., compass heading), headlight status, gas mileage, etc. In some aspects, the one or more sensors 260 may provide means for sensing or detecting information related to the state and/or environment of the operator or the driver of the vehicle, such as the driver's engagement type or level (e.g., alertness or drowsiness, facial expressions, eye-blinking rates, eyes-on-the-road rates) or the like. By way of example, the one or more sensors 260 may include an odometer, a speedometer, a tachometer, an accelerometer (e.g., a micro-electrical mechanical system (MEMS) device), a gyroscope, a geomagnetic sensor (e.g., a compass), an altimeter (e.g., a barometric pressure altimeter), an in-cabin camera (for visible and/or infrared spectrum), a driver eye-tracking sensing device, etc. Although shown as located outside the processing device 200, some of these sensors 260 may be located on the processing device 200 and some may be located elsewhere in the vehicle.

The processing device 200 may further include a driver assistance component 218. The driver assistance component 218 may be a hardware circuit that is part of or coupled to the one or more processors 206 that, when operated, causes the processing device 200 to perform the functionality described herein. In other aspects, the driver assistance component 218 may be external to the one or more processors 206 (e.g., part of a positioning processing system, integrated with another processing system, etc.). Alternatively, the driver assistance component 218 may be one or more program modules (e.g., executable instructions) stored in the memory 204 that, when executed by the one or more processors 206 (or positioning processing system, another processing system, etc.), cause the processing device 200 to perform the functionality described herein. As a specific example, the driver assistance component 218 may comprise a plurality of positioning engines, a positioning engine aggregator, a route planning engine, a sensor fusion module, and/or the like. FIG. 2A illustrates possible locations of the driver assistance component 218, which may be, for example, part of the memory 204, the one or more processors 206, or any combination thereof, or may be a standalone component.

Although not shown, the processing device 200 may include or be coupled to a user interface (e.g., a touchscreen) for providing indications (e.g., audible and/or visual indications) to a user and/or for receiving user input (e.g., upon user actuation of a sensing device such a keypad, a touch screen, a microphone, and so on).

Figure 2B:
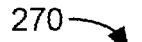
FIG. 2B is a simplified block diagram of an example server device, according to aspects of the disclosure.

FIG. 2B is a simplified block diagram of an example server device 270, according to aspects of the disclosure. In some aspects, the server device 270 may correspond to the server device 108 in FIG. 1 and may be a location server, a location management function (LMF) entity in a wireless network, a proprietary server, or the like.

It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

In some aspects, the server device 270 may include one or more network transceivers 290 that provides means for communicating (e.g., means for transmitting, means for receiving, etc.) with other network entities (e.g., other base stations and/or other network entities) via a network (e.g., the network 120). For example, the server device 270 may employ the one or more network transceivers 290 to communicate with one or more base stations via the network 120 over one or more wired or wireless backhaul links, or with other network entities via the network 120 over one or more wired or wireless core network interfaces.

The server device 270 also includes other components that may be used in conjunction with the operations as disclosed herein. The server device 270 may include one or more processors 294 for providing functionality relating to, for example, wireless communication, and for providing other processing functionality. The processors 294 may therefore provide means for processing, such as means for determining, means for calculating, means for receiving, means for transmitting, means for indicating, etc. In an aspect, the processors 294 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The server device 270 may include memory circuitry implementing a memory 296 (e.g., including a memory device) for maintaining information (e.g., information indicative of reserved resources, thresholds, parameters, and so on). The memory 296 may therefore provide means for storing, means for retrieving, means for maintaining, etc. In some cases, the server device 270 may include a driver assistance component 298. The driver assistance component 298 may be hardware circuits that are part of or coupled to the processors 294 that, when operated, cause the server device 270 to perform the functionality described herein. In other aspects, the driver assistance component 298 may be external to the processors 294 (e.g., part of a modem processing system, integrated with another processing system, etc.). Alternatively, the driver assistance component 298 may be program modules (e.g., executable instructions) stored in the memory 296 that, when executed by the processors 294 (or a modem processing system, another processing system, etc.), cause the server device 270 to perform the functionality described herein. FIG. 2B illustrates possible locations of the driver assistance component 298, which may be, for example, part of the one or more network transceivers 290, the memory 296, the one or more processors 294, or any combination thereof, or may be a standalone component.

The various components of the server device 270 may be communicatively coupled to each other over the data bus 292. In an aspect, the data bus 292 may form, or be part of, a communication interface of the server device 270.

For convenience, the processing device 200 shown in FIG. 2A and the server device 270 shown in FIG. 2B are depicted as including various components that may be configured according to the various examples described herein. It will be appreciated, however, that the illustrated components may have different functionality in different designs. In particular, various components in FIGS. 2A and 2B may be optional in alternative configurations and the various aspects include configurations that may vary due to design choice, costs, use of the device, or other considerations. For example, a particular implementation of processing device 200 may omit the WWAN transceiver(s) 230 (e.g., an OBC may have Wi-Fi and/or BLUETOOTH® capability without cellular capability), or may omit the short-range wireless transceiver(s) 240 (e.g., cellular-only, etc.), and so on. For brevity, illustration of the various alternative configurations is not provided herein, but would be readily understandable to one skilled in the art.

The components of FIGS. 2A and 2B may be implemented in various ways. In some implementations, the components of FIGS. 2A and 2B may be implemented in one or more circuits such as, for example, one or more processors and/or one or more application-specific integrated circuits (ASICs) (which may include one or more processors). Here, each circuit may use and/or incorporate at least one memory component for storing information or executable code used by the circuit to provide this functionality.

For simplicity, various operations, acts, and/or functions are described herein as being performed "by a processing device onboard a vehicle" "by a server device," or the like. However, as will be appreciated, such operations, acts, and/or functions may actually be performed by specific components or combinations of components of the processing device 200 or the server device 270, such as the processors 206 and 294, the transceivers 230, 240, and 290, the memories 204 and 296, the driver assistance component 218 and 298, etc.

In some aspects, while planning a route for a vehicle or configuring parameters of an ADAS or an ADS of a vehicle, it may be beneficial to have the knowledge of whether a particular traffic segment (e.g., the traffic segment within which the vehicle is currently travelling) is nice, friendly, or safe (e.g., niceness of a traffic segment). In some aspects, the niceness of a traffic segment may be evaluated based on many factors. In this disclosure, a collective behavior assessment of a traffic segment may be determined and used to evaluate the niceness of a traffic segment from at least the aspect of the behavior patterns of the vehicles interacting with the traffic segment. In some aspects, the collective behavior assessment of a traffic segment may be determined based on individual behavior assessments of the vehicles interacting with the traffic segment, as local information (e.g., the individual behavior assessments) may lead to global wisdom (e.g., the collective behavior assessment). In some aspects, the collective behavior assessment of a traffic segment may be determined further based on configuration information of the corresponding traffic segment. In some aspects, a route planning process may favor more friendly traffic segments over less friendly traffic segments (based on the corresponding collective behavior assessments thereof). In some aspects, a vehicle travelling or entering a traffic segment may configure parameters of the ADAS or the ADS to be more or less responsive or aggressive based on a collective behavior assessment of the traffic segment. In some aspects, an operator or a driver of a vehicle may receive notification regarding whether a particular traffic segment is deemed a "friendly," "safe," and/or "nice" segment via a human-machine interface.

Figure 3:
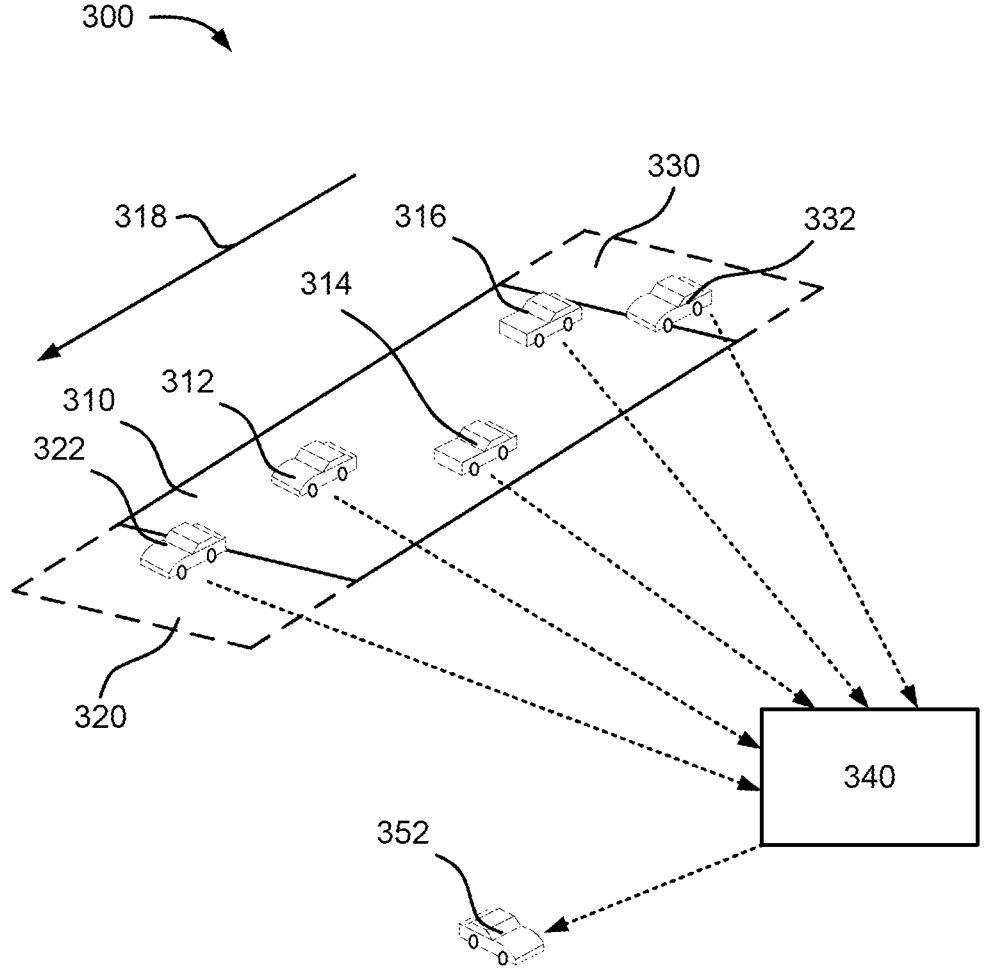
FIG. 3 illustrates an example scenario for determining a collective behavior assessment of a traffic segment based on parameters reported by reporting vehicles, according to aspects of the disclosure.

FIG. 3 illustrates an example scenario 300 for determining a collective behavior assessment of a traffic segment 310 based on parameters reported by reporting vehicles, according to aspects of the disclosure. As shown in the scenario 300, three vehicles 312, 314, and 316 are travelling within the traffic segment 310, a vehicle 322 is leaving the traffic segment 310 and entering a traffic segment 320, and a vehicle 332 is entering the traffic segment 310 and leaving a traffic segment 330. The traffic segment 310 may have a designated direction of movement 318. In this example, the vehicles 312, 314, 316, 322, and 332 may be deemed as interacting with the traffic segment 310. In some aspects, the number and arrangement of vehicles and the number and arrangement of traffic segments in FIG. 3 are depicted as a non-limiting example.

As shown in FIG. 3, the example scenario 300 further includes a server device 340. In some aspects, a portion or all of the vehicles 312, 314, 316, 322, and 332 may be configured to function as one or more reporting vehicles that can report one or more corresponding sets of parameters related to the respective vehicles. In some aspects, the server device 340 may receive, from each one of one or more reporting vehicles, a corresponding set of parameters based on a wireless communication technology. In some aspects, the server device 340 may determine an individual behavior assessment for each vehicle interacting with respective one of the one or more traffic segments (e.g., including the one or more reporting vehicles or one or more vehicles not reporting their parameters) based on the corresponding set of parameters reported by the one or more reporting vehicles. In some aspects, the server device 340 may determine a collective behavior assessment for the traffic segment 310 based on the one or more individual behavior assessments associated with the corresponding traffic segment and configuration information of the traffic segment 310. In some aspects, the configuration information of the traffic segment 310 may include a direction of movement of the traffic segment, a lane pattern of the traffic segment, a geographic area that encompasses the traffic segment, or any combination thereof.

In some aspects, the server device 340 may transmit driver assistance data to a subscribing vehicle (e.g., the vehicle 352 subscribing for the assistance data), and the driver assistance data may include at least the collective behavior assessment of the traffic segment 310. In some aspects, the driver assistance data may be transmitted to the subscribing vehicle 352 on-demand based on a request from the subscribing vehicle 352, or periodically based on an update period.

Figure 4A:
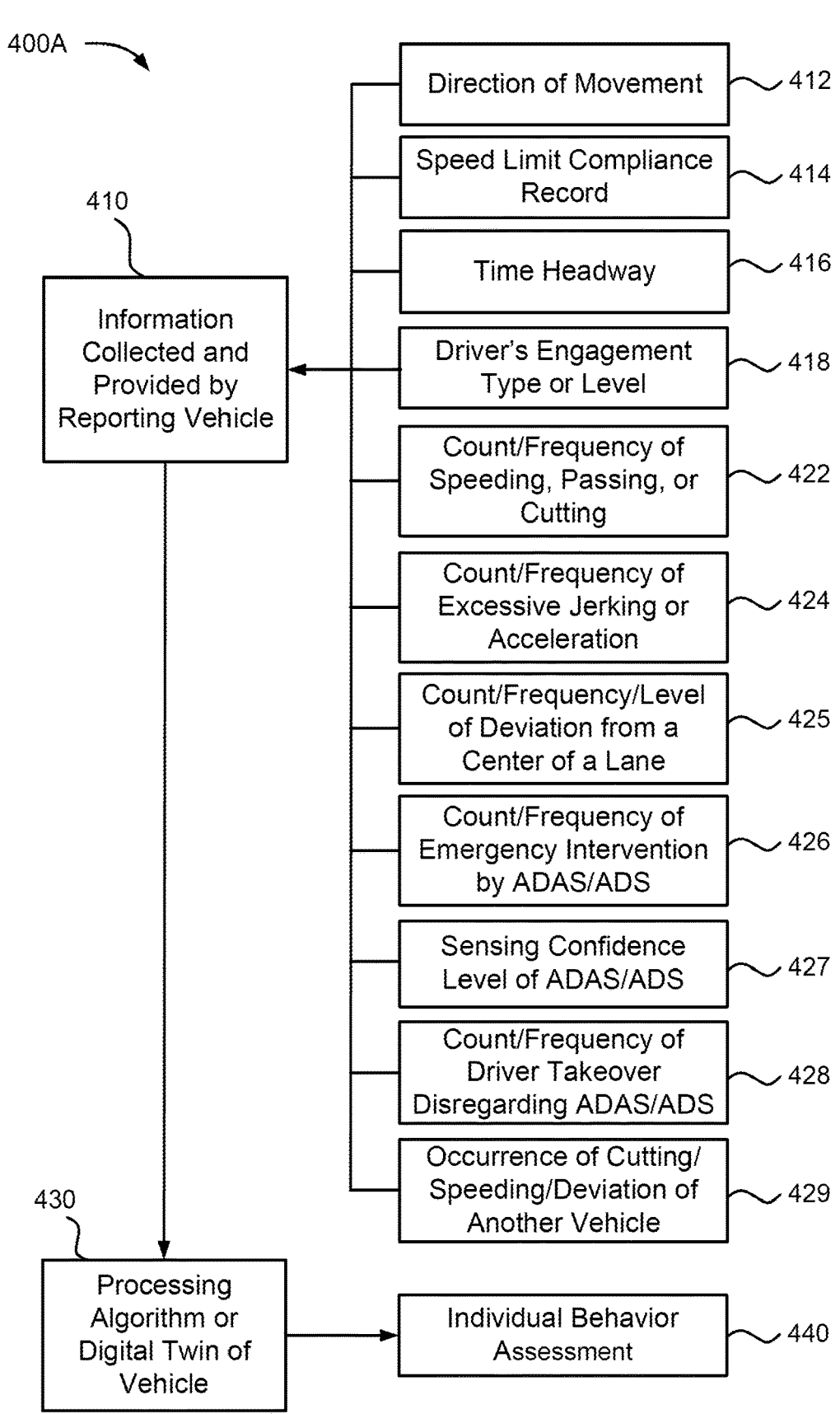
FIG. 4A illustrates a processing flow for determining an individual behavior assessment of a vehicle, according to aspects of the disclosure.

FIG. 4A illustrates a processing flow 400A for determining an individual behavior assessment of a vehicle (e.g., one of the vehicles 312, 314, 316, 322, and 332), according to aspects of the disclosure. In some aspects, the processing flow 400A indicates the operations performed by a server device (e.g., the server device 340).

In some aspects, the server device may receive from a reporting vehicle a set of parameters related to the reporting vehicle as well as other vehicles observable by the reporting vehicle. In some aspects, the set of parameters may correspond to information collected and provided by the reporting vehicle (e.g., block 410). In some aspects, the set of parameters may include a direction of movement 412 of the reporting vehicle, a speed limit compliance record 414 of the reporting vehicle, a time headway 416 of the reporting vehicle, a driver's engagement type or level 418 of the reporting vehicle, a count or a frequency of speeding, passing, and/or cutting movements 422 of the reporting vehicle, a count or a frequency of a jerk being greater than a jerk reference level and/or an acceleration being greater than an acceleration reference level 424 of the reporting vehicle, a count, a frequency, or a level of deviation from a center of a lane (e.g., block 425), a count or a frequency of engagements of emergency intervention by an ADAS or an ADS 426 of the reporting vehicle, a sensing confidence level of the ADAS or an ADS 427 of the reporting vehicle, a count or a frequency of the driver of the reporting vehicle taking over (i.e., driver takeover) an operation of the reporting vehicle disregarding an ADAS or an ADS 428 of the reporting vehicle that is in operation (e.g., block 428), an observed occurrence of cutting, speeding, or deviation of another vehicle(s) (e.g., block 429), or any combination thereof. In some aspects, based on the set of parameters, the server device may analyze the set of parameters based on a processing algorithm or a digital twin of the reporting vehicle (e.g., block 430) and obtain an individual behavior assessment 440 of the reporting vehicle and/or the another vehicle(s).

In some aspects, the direction of movement 412 of the reporting vehicle may indicate if the reporting vehicle is moving in consistent with a direction of movement of the traffic segment. In some aspects, the speed limit compliance record 414, the count or the frequency of speeding, passing, and/or cutting movements 422, and/or the count or the frequency of a jerk being greater than the jerk reference level and/or an acceleration being greater than the acceleration reference level 424 may indicate whether a driver of the reporting vehicle is more or less likely to engage in aggressive driving behavior. In some aspects, the time headway 416 may indicate if the driver keeps a reasonable distance from a previous vehicle. In some aspects, the driver's engagement type or level 418, the count, the frequency, or the level of deviation from the center of the lane 425, the count or the frequency of engagements of emergency intervention by the ADAS or the ADS 426, and/or the frequency of driver take over disregarding the ADAS or the ADS 428 may indicate the likelihood of the driver being distracted. Also, the sensing confidence level of the ADAS or the ADS 427 may be used to adjust the analysis process based on the parameters related to the ADAS or the ADS of the reporting vehicle.

Additionally or optionally, the observed occurrence of cutting, speeding, or deviation of another vehicle 429 may be detected based on the radar-camera sensor module 220 in FIG. 2A and may be used to determine the individual behavior assessment of the other vehicle as observed by the reporting vehicle. In some aspects, the observed occurrence of cutting, speeding, or deviation of another vehicle 429 may be used to remedy the lack of reporting and/or false reporting by the other vehicle.

Moreover, as a vehicle may be constantly moving within a traffic segment and/or from one traffic segment to another, the determined individual behavior assessment of such vehicle may be only valid for a certain period of time. In some aspects, the determined individual behavior assessment may be associated with a timestamp or a time duration during which the determined individual behavior assessment is valid. In some aspects, the server device may update the individual behavior assessment of a given vehicle periodically and/or upon expiration of the previously determined individual behavior assessment.

Figure 4B:
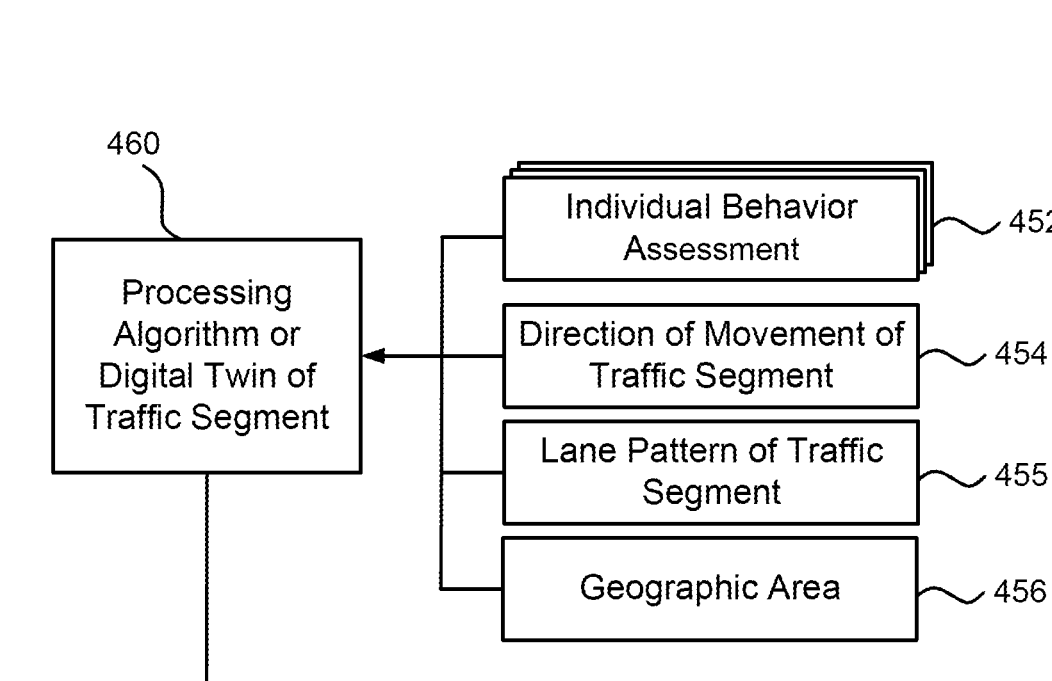
FIG. 4B illustrates a processing flow for determining a collective behavior assessment of a traffic segment based on one or more individual behavior assessment of one or more vehicles, according to aspects of the disclosure.

FIG. 4B illustrates a processing flow 400B for determining a collective behavior assessment of a traffic segment (e.g., the traffic segment 310) based on one or more individual behavior assessments of one or more vehicles (e.g., the vehicles 312, 314, 316, 322, and 332), according to aspects of the disclosure.

In some aspects, the server device may obtain the one or more individual behavior assessments 452 of the one or more reporting vehicles (e.g., the vehicles 312, 314, 316, 322, and 332) interacting with the traffic segment (e.g., the traffic segment 310) according to the processing flow 400A. In some aspects, the server device may obtain information regarding the traffic segment such as a direction of movement of the traffic segment 454, a lane pattern of the corresponding traffic segment 455 (e.g., a number of lanes, branches, intersections, merges, etc.), and/or a geographic area 456 that encompasses the traffic segment. In some aspects, the server device may analyze the one or more individual behavior assessments 452, the direction of movement of the traffic segment 454, the lane pattern of the corresponding traffic segment 455, and/or the geographic area 456 based on a processing algorithm or a digital twin of the traffic segment (e.g., block 460) and obtain a collective behavior assessment 470 of the traffic segment.

In some aspects, the one or more individual behavior assessments 452 may indicate whether any of the vehicles may be too aggressive or even dangerous to other vehicles traveling within the traffic segment. In some aspects, the server device may mark an individual vehicle as potentially hazardous to the traffic segment and thus may determine the collective behavior assessment 470 in association with the time the hazardous vehicle is about to enter the traffic segment, is currently travelling within the traffic segment, and/or is about to leave the traffic segment. In some aspects, the impact of individual vehicles may be evaluated together with a total volume of the vehicles within the traffic segment and/or a capacity of the traffic segment. Also, the direction of movement of the traffic segment 454, the lane pattern of the corresponding traffic segment 455, and the geographic area 456 may be associated with additional road condition information such as a speed limit of a road, a capacity limit of the road, and/or whether a road in the traffic segment is slippery or having sufficient roadway lighting.

In some aspects, the collective behavior assessment 470 may correspond to a rating selected from at least a first candidate rating and a second candidate rating, where the first candidate rating may indicate that the traffic segment is recommended to be selected in a route planning process, and the second candidate rating may indicate that the traffic segment is recommended to be avoided in the route planning process. In some aspects, for a traffic segment, different collective behavior assessments 470 may be determined in association with different types of vehicles. For example, a traffic segment that is recommended for route planning for a vehicle with all-wheel-drive capability may not be recommended for route planning for a vehicle without all-wheel-drive capability. In another example, a traffic segment that is recommended for route planning for a motorcycle may not be recommended for a car or a truck.

Moreover, similar to the time-varying nature of the individual behavior assessments of the vehicles, the collective behavior assessment of a traffic segment may vary with time and may be valid for a certain period of time. In some aspects, the determined collective behavior assessment may be associated with a timestamp or a time duration during which the determined collective behavior assessment is valid. In some aspects, the server device may update the collective behavior assessment of a given traffic segment periodically and/or upon expiration of the previously determined collective behavior assessment.

Figure 5A:
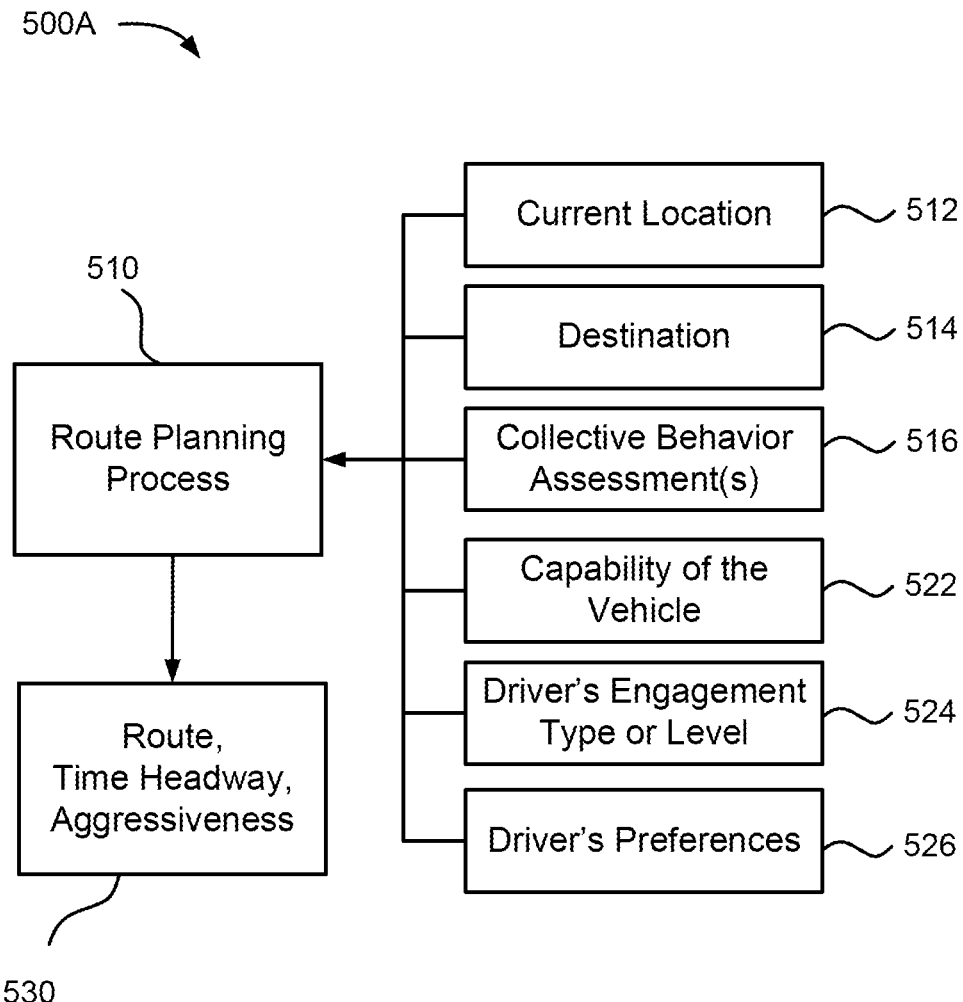
FIG. 5A illustrates a processing flow for planning a route for a subscribing vehicle, according to aspects of the disclosure.

FIG. 5A illustrates a processing flow 500A for planning a route for a subscribing vehicle (e.g., the vehicle 352 subscribing for obtaining assistance data from the server device 340), according to aspects of the disclosure. In some aspects, the processing flow 500A indicates the operations performed by a processing device onboard the subscribing vehicle (may be simply described as performed by the subscribing vehicle for simplicity) or by a routing server device outside the vehicle.

In some aspects, the processing device onboard the subscribing vehicle (or the routing server device via the processing device onboard the subscribing vehicle) may receive from a server device driver assistance data that indicate at least one or more collective behavior assessments 516 of one or more traffic segments between a current location 512 of the subscribing vehicle and a destination 514 of the subscribing vehicle. In some aspect, the driver assistance data may be received by the subscribing vehicle based on a request from the subscribing vehicle or based on an update period.

In some aspects, the processing device onboard the subscribing vehicle may engage in a route planning process (e.g., block 510) to obtain a planned route (processed by the processing device or the routing server device) from the current location 512 to the destination 514 based on the one or more collective behavior assessments 516 of the one or more traffic segments. In some aspects, the planned route the planned route may include a qualified traffic segment from the one or more traffic segments that the subscribing vehicle meets a set of requirements set forth for the corresponding collective behavior assessment of the qualified traffic segment, and the set of requirements corresponds to capability information related to the subscribing vehicle (e.g., block 522), a driver's engagement type or level (e.g., block 524), a driver's preferences (e.g., block 526), or any combination thereof. In some aspects, together with the planned route, the processing device onboard the subscribing vehicle or the routing server device may perform the route planning process to determine a suggested headway and/or a suggested aggressiveness of the ADAS/ADS settings (e.g., block 530).

In some aspects, the capability information related to the subscribing vehicle (e.g., block 522) may include a type of the subscribing vehicle, presence or absence of an autonomous emergency braking system, a sensitivity level of the autonomous emergency braking system, presence or absence of a forward collision warning system, presence or absence of a level 2 driving automation, presence or absence of a level 3 driving automation, tire friction, braking forces, a turning radius limit, a weight of the subscribing vehicle, driver's abilities, or any combination thereof. In some aspects, the driver's preferences may include an allowable detour (e.g., defined based on additional time, additional distance, or additional fuel consumption of travel compared with the route optimized based on time2, distance, and/or duel consumption of travel). In some aspects, the driver's preferences may include limits with respect to acceleration, braking, and/or the collective behavior assessments of the traffic segments to be included in the planned route.

Figure 5B:
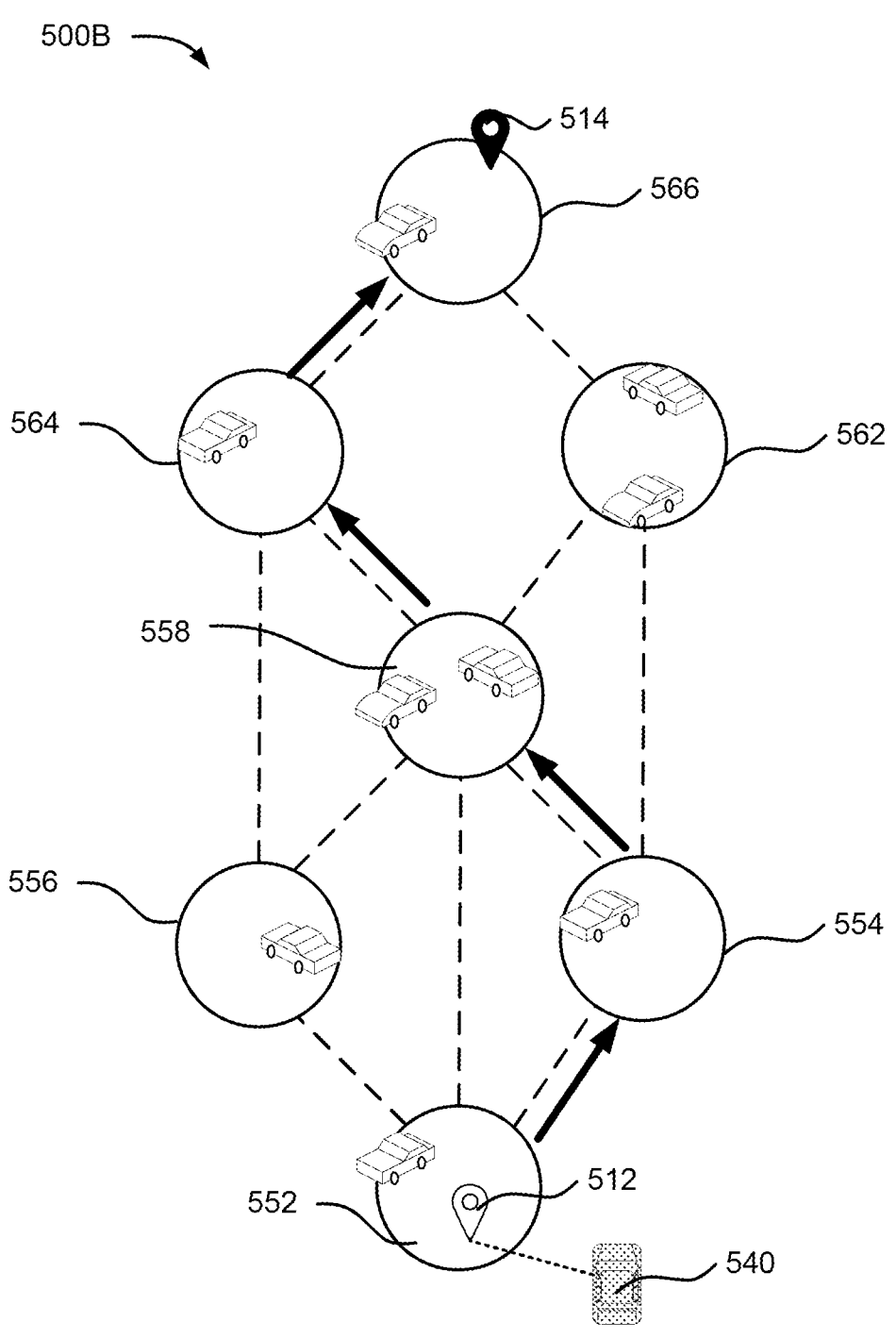
FIG. 5B illustrates an example scenario for planning a route for a subscribing vehicle, according to aspects of the disclosure.

FIG. 5B illustrates an example scenario 500B for planning a route for a subscribing vehicle 540, according to aspects of the disclosure. In some aspects, the subscribing vehicle 540 may correspond to the vehicle 352.

In some aspects, a processing device onboard the subscribing vehicle 540 may engage in a route planning process (e.g., block 510) to obtain a planned route from a current location 512 to a destination 514. Possible routes may be planned based on traffic segments 552, 554, 556, 558, 562, 564, and 566 that are interconnected with one another based on the dotted connecting lines depicted in FIG. 5B. In some aspects, the server device may receive corresponding sets of parameters of reporting vehicles (not labeled) interacting with the traffic segments 552, 554, 556, 558, 562, 564, and 566, and determine the respective collective behavior assessments of the traffic segments 552, 554, 556, 558, 562, 564, and 566 as illustrated with reference to FIGS. 4A and 4B. In some aspects, the processing device onboard the subscribing vehicle 540 may receive driver assistance data from a server device (e.g., the server device 340). In some aspects, the driver assistance data may include the collective behavior assessments of the traffic segments 554, 558, and 564 indicating that these traffic segments are recommended to be included in the route planning process (also referred to as "blue zones"), and the collective behavior assessments of the traffic segments 556 and 562 indicating that these traffic segments are recommended to be avoided in the route planning process (also referred to as "red zones").

In some aspects, the processing device onboard the subscribing vehicle 540 or a routing server device may plan the route (depicted as solid arrows) from the traffic segment 552 encompassing the current location 512, to the traffic segment 554, the traffic segment 558, the traffic segment 564, and then to the traffic segment 586 encompassing the destination 514 by favoring the blue zones over the red zones. In some aspects, as the individual behavior assessments of the vehicles and the collective behavior assessments of the traffic segments may vary from time to time, and the planned route may thus dynamically changed or updated based on the updated collective behavior assessments. In some aspects, as the collective behavior assessments may be different for different types of vehicles, and the acceptance to different collective behavior assessments may vary depending on the driver's profile and preferences, the route planning process may return different planning results for two different vehicles or even two different drivers of similar vehicles.

Figure 6:
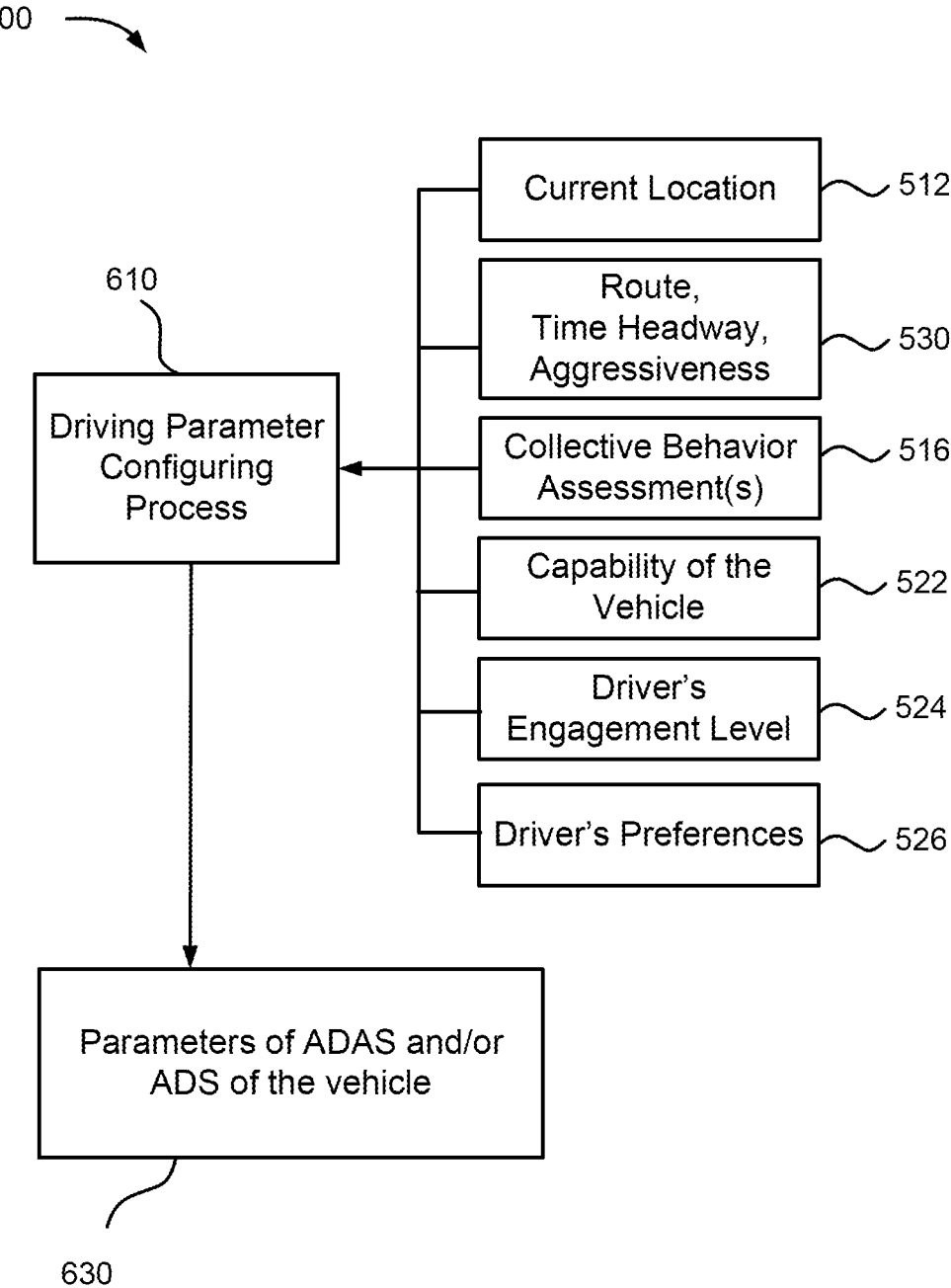
FIG. 6 illustrates an example processing flow for configuring parameters of an advanced driver assistance system (ADAS) or an automated driving systems (ADS) of a subscribing vehicle, according to aspects of the disclosure.

FIG. 6 illustrates an example processing flow 600 for configuring parameters of an ADAS or an ADS of a subscribing vehicle (e.g., the vehicle 352 subscribing for obtaining assistance data from the server device 340), according to aspects of the disclosure. In some aspects, the processing flow 600 indicates the operations performed by a processing device onboard the subscribing vehicle. In some aspects, the components in FIG. 6 that are the same or similar to those in FIG. 5A are given the same reference numbers, and detailed description thereof may be omitted.

In some aspects, the processing device onboard the subscribing vehicle may receive from a server device driver assistance data that indicates at least one or more collective behavior assessments 516 of one or more traffic segments. In some aspect, the driver assistance data may be received by the subscribing vehicle based on a request from the subscribing vehicle or based on an update period. In some aspects, the processing device onboard the subscribing vehicle may identify a current traffic segment in which the current location 512 is located, and may configure parameters of an ADAS or an ADS of the subscribing vehicle based on a current collective behavior assessment of the current traffic segment. In some aspects, the processing device onboard the subscribing vehicle may perform a driving parameter configuring process (e.g., block 610) to determine and configure the parameters of ADAS and/or ADS of the subscribing vehicle (e.g., block 630) based on the current location 512, the planed route, suggested headway, and/or suggested aggressiveness of the ADAS/ADS settings 530, the collective behavior assessments 516, the capability information related to the subscribing vehicle 522, the driver's engagement type or level 524, the driver's preferences 526, or any combination thereof.

For example, if the collective behavior assessment of the current traffic segment indicates that the current traffic segment is recommended to be avoided (i.e., a red zone) but the subscribing vehicle has to travel through the traffic segment anyway, the subscribing vehicle may adjust the sensitivity of the sensors of the ADAS/ADS, adjusting the maneuver settings, or adjust the emergency braking force such that the subscribing vehicle may be more responsive to any unexpected events that may happen within the current traffic segment. In some aspects, the parameters of the ADAS/ADS subject to configuration or adjustment in view of the driver assistance data may include a level of driving aggressiveness, a required driver's engagement type or level, a sensitivity of an autonomous emergency braking system, or any combination thereof.

FIG. 7 is a flowchart illustrating an example method 700 of operating a server device, according to aspects of the disclosure. In some aspects, the server device in the method 700 may correspond to the server device 340, the server device 270, or the server device 108. In some aspects, the method 700 may be performed by the one or more network transceivers 290, the one or more processors 294, the memory 296, and/or the driver assistance component 298, any or all of which may be considered means for performing one or more of the following operations of method 700.

At operation 710, the server device may receive, from each reporting vehicle of one or more reporting vehicles (e.g., the vehicles 312, 314, 316, 322, and/or 332 or the vehicles depicted in FIG. 5B) interacting with one or more traffic segments (e.g., the traffic segment 310 or the traffic segments 552, 554, 556, 558, 562, 564, and/or 566), a corresponding set of parameters. In some aspects, the set of parameters from a corresponding reporting vehicle may include a direction of movement, a speed limit compliance record, a time headway, a driver's engagement type or level, a count or a frequency of speeding, passing, and/or cutting movements, a count or a frequency of a jerk being greater than a jerk reference level and/or an acceleration being greater than an acceleration reference level, a count, a frequency, or a level of deviation from a center of a lane, a count or a frequency of engagements of emergency intervention by an ADAS, a sensing confidence level of the ADAS or an ADS, an observed occurrence of cutting, speeding, or deviation of another vehicle, or any combination thereof. In some aspects, operation 710 may be performed by the one or more network transceivers 290, the one or more processors 294, the memory 296, and/or the driver assistance component 298, any or all of which may be considered means for performing operation 710.

At operation 720, the server device may determine an individual behavior assessment for each vehicle interacting with respective one of the one or more traffic segments based on the corresponding set of parameters. In some aspects, the server device may determine the individual behavior assessment as illustrated with reference to FIG. 4A. In some aspects, operation 720 may be performed by the one or more network transceivers 290, the one or more processors 294, the memory 296, and/or the driver assistance component 298, any or all of which may be considered means for performing operation 720.

At operation 730, the server device may determine a collective behavior assessment for each traffic segment of the one or more traffic segments based on one or more individual behavior assessments associated with the corresponding traffic segment and configuration information of the corresponding traffic segment. In some aspects, the configuration information of the corresponding traffic segment may include a direction of movement of the corresponding traffic segment, a lane pattern of the corresponding traffic segment, a geographic area that encompasses the corresponding traffic segment, or any combination thereof. In some aspects, the one or more collective behavior assessments may correspond to one or more ratings selected from at least a first candidate rating indicating that the corresponding traffic segment is recommended to be selected in a route planning process, and a second candidate rating indicating that the corresponding traffic segment is recommended to be avoided in the route planning process.

In some aspects, the server device may determine the collective behavior assessment as illustrated with reference to FIG. 4B. In some aspects, operation 730 may be performed by the one or more network transceivers 290, the one or more processors 294, the memory 296, and/or the driver assistance component 298, any or all of which may be considered means for performing operation 730.

At operation 740, the server device may transmit driver assistance data to a subscribing vehicle (e.g., the vehicle 352), the driver assistance data including at least the one or more collective behavior assessments of the one or more traffic segments. In some aspects, the driver assistance data may be transmitted to the subscribing vehicle based on a request from the subscribing vehicle or based on an update period. In some aspects, the server device may transmit the driver assistance data to the subscribing vehicle as illustrated with reference to FIG. 3. In some aspects, operation 740 may be performed by the one or more network transceivers 290, the one or more processors 294, the memory 296, and/or the driver assistance component 298, any or all of which may be considered means for performing operation 740.

As will be appreciated, a technical advantage of the method 700 is determining by a server device collective behavior assessment of traffic segments based on individual behavior assessment of vehicles interacting with the traffic segments, which are further based on parameters reported by reporting vehicles. In some aspects, such collective behavior assessment of the traffic segments may be included in driver assistance data to be transmitted to a subscribing vehicle. In some aspects, the collective behavior assessment of the traffic segments may be dynamically updated. Accordingly, the server device may offer the subscribing vehicle the dynamically updated information regarding whether a particular traffic segment is nice, friendly, or safe in view of the behavior of other vehicles interacting with the traffic segment.

FIG. 8 is a flowchart illustrating an example method 800 of operating a processing device of a subscribing vehicle, according to aspects of the disclosure. In some aspects, the processing device in the method 800 may correspond to a processing device onboard the vehicle 352 or the processing device 200. In some aspects, the method 800 may be performed by the one or more WWAN transceivers 230, the one or more short-range transceivers 240, the one or more processors 206, the memory 204, and/or the driver assistance component 218, any or all of which may be considered means for performing one or more of the following operations of method 800.

At operation 810, the processing device of the subscribing vehicle may receive driver assistance data including at least one or more collective behavior assessment of one or more traffic segments (e.g., the traffic segment 310 or the traffic segments 552, 554, 556, 558, 562, 564, and/or 566) between a current location of the subscribing vehicle and a destination of the subscribing vehicle. In some aspects, the one or more collective behavior assessment may be determined by the server device based on one or more individual behavior assessments of the one or more vehicles interacting with the one or more traffic segments. In some aspects, the one or more collective behavior assessments may correspond to one or more ratings from at least a first candidate rating indicating that the corresponding traffic segment is recommended to be selected in the route planning process, and a second candidate rating indicating that the corresponding traffic segment is recommended to be avoided in the route planning process. In some aspects, the driver assistance data is received by the subscribing vehicle based on a request from the subscribing vehicle or based on an update period. In some aspects, operation 810 may be performed by the one or more WWAN transceivers 230, the one or more short-range transceivers 240, the one or more processors 206, the memory 204, and/or the driver assistance component 218, any or all of which may be considered means for performing operation 810.

At operation 820, the processing device of the subscribing vehicle may engage in a route planning process to obtain a planned route from the current location to the destination based on the one or more collective behavior assessments of the one or more traffic segments. In some aspects, the planned route may include a qualified traffic segment from the one or more traffic segments that the subscribing vehicle meets a set of requirements set forth for the corresponding collective behavior assessment of the qualified traffic segment, and the set of requirements corresponds to capability information related to the subscribing vehicle, a driver's engagement type or level, a driver's preference setting, or any combination thereof. In some aspects, the capability information related to the subscribing vehicle may include a type of the subscribing vehicle, presence or absence of an autonomous emergency braking system, a sensitivity level of the autonomous emergency braking system, presence or absence of a forward collision warning system, presence or absence of a level 2 driving automation, presence or absence of a level 3 driving automation, tire friction, braking force, a turning radius limit, a weight of the subscribing vehicle, driver's abilities, or any combination thereof.

In some aspects, the processing device of the subscribing vehicle may engage in the route planning process as illustrated with reference to FIGS. 5A and 5B. In some aspects, operation 820 may be performed by the one or more WWAN transceivers 230, the one or more short-range transceivers 240, the one or more processors 206, the memory 204, and/or the driver assistance component 218, any or all of which may be considered means for performing operation 820.

In some aspects, the processing device of the subscribing vehicle may further identify a current traffic segment in which the current location is located. In some aspects, the processing device of the subscribing vehicle may configure parameters of an ADAS or an ADS of the subscribing vehicle based on at least a current collective behavior assessment of the current traffic segment. In some aspects, the parameters may correspond to a level of driving aggressiveness, a required driver's engagement type or level, a sensitivity of an autonomous emergency braking system, or any combination thereof. In some aspects, the processing device of the subscribing vehicle may configure the parameters of the ADAS or the ADS of the subscribing vehicle as illustrated with reference to FIG. 6.

As will be appreciated, a technical advantage of the method 800 is receiving by a subscribing vehicle from a server device driver assistance data that includes at least collective behavior assessments of traffic segments. In some aspects, the collective behavior assessments of traffic segments may be determined by the server device based on individual behavior assessments of vehicles interacting with the traffic segments, which are further based on parameters reported by reporting vehicles. In some aspects, the subscribing vehicle may obtain a planned route that is planed based on the collective behavior assessments of the traffic segments. In some aspects, the subscribing vehicle may configure parameters of ADAS/ADS based on the collective behavior assessments of the traffic segments. In some aspects, an operator or a driver of a vehicle may receive notification regarding whether a particular traffic segment is deemed a "friendly," "safe," and/or "nice" segment via a human-machine interface. Accordingly, the subscribing vehicle (including the processing device for implementing the ADAS/ADS, an operator of the vehicle, and/or a driver of the vehicle) may obtain the information regarding whether a particular traffic segment is nice, friendly, or safe in view of the behavior of other vehicles interacting with the traffic segment and may operate the subscribing vehicle accordingly.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a server device, comprising: receiving, from each reporting vehicle of one or more reporting vehicles interacting with one or more traffic segments, a corresponding set of parameters; determining an individual behavior assessment for each vehicle interacting with respective one of the one or more traffic segments based on the corresponding set of parameters; determining a collective behavior assessment for each traffic segment of the one or more traffic segments based on one or more individual behavior assessments associated with the corresponding traffic segment and configuration information of the corresponding traffic segment, the driver assistance data including at least the one or more collective behavior assessments of the one or more traffic segments.

Clause 2. The method of clause 1, wherein the configuration information of the corresponding traffic segment comprises a direction of movement of the corresponding traffic segment, a lane pattern of the corresponding traffic segment, a geographic area that encompasses the corresponding traffic segment, or any combination thereof.

Clause 3. The method of any of clauses 1 to 2, wherein the one or more collective behavior assessments correspond to one or more ratings selected from at least: a first candidate rating indicating that the corresponding traffic segment is recommended to be selected in a route planning process, and a second candidate rating indicating that the corresponding traffic segment is recommended to be avoided in the route planning process.

Clause 4. The method of any of clauses 1 to 3, wherein the driver assistance data is transmitted to the subscribing vehicle based on a request from the subscribing vehicle or based on an update period.

Clause 5. The method of any of clauses 1 to 4, wherein the set of parameters from a corresponding reporting vehicle comprises: a direction of movement; a speed limit compliance record; a time headway; a driver's engagement type or level; a count or a frequency of speeding, passing, and/or cutting movements; a count or a frequency of a jerk being greater than a jerk reference level and/or an acceleration being greater than an acceleration reference level; a count, a frequency, or a level of deviation from a center of a lane; a count or a frequency of engagements of emergency intervention by an advanced driver assistance system (ADAS); a sensing confidence level of the ADAS or an automated driving systems (ADS); a count or a frequency of a driver of the reporting vehicle taking over an operation of the reporting vehicle disregarding the ADAS or the ADS of the reporting vehicle that is in operation; an observed occurrence of cutting, speeding, or deviation of another vehicle; or any combination thereof.

Clause 6. A method of operating a processing device of a subscribing vehicle, comprising: receiving driver assistance data including at least one or more collective behavior assessments of one or more traffic segments between a current location of the subscribing vehicle and a destination of the subscribing vehicle, the one or more collective behavior assessments being based on one or more individual behavior assessments of one or more vehicles interacting with the one or more traffic segments; and engaging in a route planning process to obtain a planned route from the current location to the destination based on the one or more collective behavior assessments of the one or more traffic segments.

Clause 7. The method of clause 6, wherein the one or more collective behavior assessments correspond to one or more ratings selected from at least: a first candidate rating indicating that the corresponding traffic segment is recommended to be selected in the route planning process, and a second candidate rating indicating that the corresponding traffic segment is assessments to be avoided in the route planning process.

Clause 8. The method of any of clauses 6 to 7, wherein the planned route includes a qualified traffic segment from the one or more traffic segments that the subscribing vehicle meets a set of requirements set forth for the corresponding collective behavior assessment of the qualified traffic segment, and the set of requirements corresponds to: capability information related to the subscribing vehicle; a driver's engagement type or level; a driver's preference setting; or any combination thereof.

Clause 9. The method of clause 8, wherein the capability information related to the subscribing vehicle comprises: a type of the subscribing vehicle; presence or absence of an autonomous emergency braking system; a sensitivity level of the autonomous emergency braking system; presence or absence of a forward collision warning system; presence or absence of a level 2 driving automation; presence or absence of a level 3 driving automation; tire friction; braking forces; a turning radius limit; a weight of the subscribing vehicle; driver's abilities; or any combination thereof.

Clause 10. The method of any of clauses 6 to 9, wherein the driver assistance data is received by the subscribing vehicle based on a request from the subscribing vehicle or based on an update period.

Clause 11. The method of any of clauses 6 to 10, further comprising: identifying a current traffic segment in which the current location is located; and configuring parameters of an advanced driver assistance system (ADAS) or an automated driving systems (ADS) of the subscribing vehicle based on a current collective behavior assessment of the current traffic segment.

Clause 12. The method of clause 11, wherein the parameters correspond to: a level of driving aggressiveness; a required driver's engagement type or level; a sensitivity of an autonomous emergency braking system; or any combination thereof.

Clause 13. A server device, comprising: one or more memories; one or more transceivers; and one or more processors communicatively coupled to the one or more memories and the one or more transceivers, the one or more processors, either alone or in combination, configured to: receive, via the one or more transceivers, from each reporting vehicle of one or more reporting vehicles interacting with one or more traffic segments, a corresponding set of parameters; determine an individual behavior assessment for each vehicle interacting with respective one of the one or more traffic segments based on the corresponding set of parameters; determine a collective behavior assessment for each traffic segment of the one or more traffic segments based on one or more individual behavior assessments associated with the corresponding traffic segment and configuration information of the corresponding traffic segment; and transmit, via the one or more transceivers, driver assistance data to a subscribing vehicle, the driver assistance data including at least the one or more collective behavior assessments of the one or more traffic segments.

Clause 14. The server device of clause 13, wherein the configuration information of the corresponding traffic segment comprises a direction of movement of the corresponding traffic segment, a lane pattern of the corresponding traffic segment, a geographic area that encompasses the corresponding traffic segment, or any combination thereof.

Clause 15. The server device of any of clauses 13 to 14, wherein the one or more collective behavior assessments correspond to one or more ratings selected from at least: a first candidate rating indicating that the corresponding traffic segment is recommended to be selected in a route planning process, and a second candidate rating indicating that the corresponding traffic segment is recommended to be avoided in the route planning process.

Clause 16. The server device of any of clauses 13 to 15, wherein the driver assistance data is transmitted to the subscribing vehicle based on a request from the subscribing vehicle or based on an update period.

Clause 17. The server device of any of clauses 13 to 16, wherein the set of parameters from a corresponding reporting vehicle comprises: a direction of movement; a speed limit compliance record; a time headway; a driver's engagement type or level; a count or a frequency of speeding, passing, and/or cutting movements; a count or a frequency of a jerk being greater than a jerk reference level and/or an acceleration being greater than an acceleration reference level; a count, a frequency, or a level of deviation from a center of a lane; a count or a frequency of engagements of emergency intervention by an advanced driver assistance system (ADAS); a sensing confidence level of the ADAS or an automated driving systems (ADS); a count or a frequency of a driver of the reporting vehicle taking over an operation of the reporting vehicle disregarding the ADAS or the ADS of the reporting vehicle that is in operation; an observed occurrence of cutting, speeding, or deviation of another vehicle; or any combination thereof.

Clause 18. A processing device of a subscribing vehicle, comprising: one or more memories; one or more transceivers; and one or more processors communicatively coupled to the one or more memories and the one or more transceivers, the one or more processors, either alone or in combination, configured to: receive, via the one or more transceivers, driver assistance data including at least one or more collective behavior assessments of one or more traffic segments between a current location of the subscribing vehicle and a destination of the subscribing vehicle, the one or more collective behavior assessments being based on one or more individual behavior assessments of one or more reporting vehicles interacting with the one or more traffic segments; and engaging in a route planning process to obtain a planned route from the current location to the destination based on the one or more collective behavior assessments of the one or more traffic segments.

Clause 19. The processing device of clause 18, wherein the one or more collective behavior assessments correspond to one or more ratings selected from at least: a first candidate rating indicating that the corresponding traffic segment is recommended to be selected in the route planning process, and a second candidate rating indicating that the corresponding traffic segment is recommended to be avoided in the route planning process.

Clause 20. The processing device of any of clauses 18 to 19, wherein the planned route includes a qualified traffic segment from the one or more traffic segments that the subscribing vehicle meets a set of requirements set forth for the corresponding collective behavior assessment of the qualified traffic segment, and the set of requirements corresponds to: capability information related to the subscribing vehicle; a driver's engagement type or level; a driver's preference setting; or any combination thereof.

Clause 21. The processing device of clause 20, wherein the capability information related to the subscribing vehicle comprises: a type of the subscribing vehicle; presence or absence of an autonomous emergency braking system; a sensitivity level of the autonomous emergency braking system; presence or absence of a forward collision warning system; presence or absence of a level 2 driving automation; presence or absence of a level 3 driving automation; tire friction; braking forces; a turning radius limit; a weight of the subscribing vehicle; driver's abilities; or any combination thereof.

Clause 22. The processing device of any of clauses 18 to 21, wherein the driver assistance data is received by the subscribing vehicle based on a request from the subscribing vehicle or based on an update period.

Clause 23. The processing device of any of clauses 18 to 22, wherein the one or more processors, either alone or in combination, are further configured to: identify a current traffic segment in which the current location is located; and configure parameters of an advanced driver assistance system (ADAS) or an automated driving systems (ADS) of the subscribing vehicle based on a current collective behavior assessment of the current traffic segment.

Clause 24. The processing device of clause 23, wherein the parameters correspond to: a level of driving aggressiveness; a required driver's engagement type or level; a sensitivity of an autonomous emergency braking system; or any combination thereof.

Clause 25. A server device, comprising: means for receiving, from each reporting vehicle of one or more reporting vehicles interacting with one or more traffic segments, a corresponding set of parameters; means for determining an individual behavior assessment for each vehicle interacting with respective one of the one or more traffic segments based on the corresponding set of parameters; means for determining a collective behavior assessment for each traffic segment of the one or more traffic segments based on one or more individual behavior assessments associated with the corresponding traffic segment and configuration information of the corresponding traffic segment; and means for transmitting driver assistance data to a subscribing vehicle, the driver assistance data including at least the one or more collective behavior assessments of the one or more traffic segments.

Clause 26. The server device of clause 25, wherein the configuration information of the corresponding traffic segment comprises a direction of movement of the corresponding traffic segment, a lane pattern of the corresponding traffic segment, a geographic area that encompasses the corresponding traffic segment, or any combination thereof.

Clause 27. The server device of any of clauses 25 to 26, wherein the one or more collective behavior assessments correspond to one or more ratings selected from at least: a first candidate rating indicating that the corresponding traffic segment is recommended to be selected in a route planning process, and a second candidate rating indicating that the corresponding traffic segment is recommended to be avoided in the route planning process.

Clause 28. The server device of any of clauses 25 to 27, wherein the driver assistance data is transmitted to the subscribing vehicle based on a request from the subscribing vehicle or based on an update period.

Clause 29. The server device of any of clauses 25 to 28, wherein the set of parameters from a corresponding reporting vehicle comprises: a direction of movement; a speed limit compliance record; a time headway; a driver's engagement type or level; a count or a frequency of speeding, passing, and/or cutting movements; a count or a frequency of a jerk being greater than a jerk reference level and/or an acceleration being greater than an acceleration reference level; a count, a frequency, or a level of deviation from a center of a lane; a count or a frequency of engagements of emergency intervention by an advanced driver assistance system (ADAS); a sensing confidence level of the ADAS or an automated driving systems (ADS); a count or a frequency of a driver of the reporting vehicle taking over an operation of the reporting vehicle disregarding the ADAS or the ADS of the reporting vehicle that is in operation; an observed occurrence of cutting, speeding, or deviation of another vehicle; or any combination thereof.

Clause 30. A processing device of a subscribing vehicle, comprising: means for receiving driver assistance data including at least one or more collective behavior assessments of one or more traffic segments between a current location of the subscribing vehicle and a destination of the subscribing vehicle, the one or more collective behavior assessments being based on one or more individual behavior assessments of one or more reporting vehicles interacting with the one or more traffic segments; and means for engaging in a route planning process to obtain a planned route from the current location to the destination based on the one or more collective behavior assessments of the one or more traffic segments.

Clause 31. The processing device of clause 30, wherein the one or more collective behavior assessments correspond to one or more ratings selected from at least: a first candidate rating indicating that the corresponding traffic segment is recommended to be selected in the route planning process, and a second candidate rating indicating that the corresponding traffic segment is recommended to be avoided in the route planning process.

Clause 32. The processing device of any of clauses 30 to 31, wherein the planned route includes a qualified traffic segment from the one or more traffic segments that the subscribing vehicle meets a set of requirements set forth for the corresponding collective behavior assessment of the qualified traffic segment, and the set of requirements corresponds to: capability information related to the subscribing vehicle; a driver's engagement type or level; a driver's preference setting; or any combination thereof.

Clause 33. The processing device of clause 32, wherein the capability information related to the subscribing vehicle comprises: a type of the subscribing vehicle; presence or absence of an autonomous emergency braking system; a sensitivity level of the autonomous emergency braking system; presence or absence of a forward collision warning system; presence or absence of a level 2 driving automation; presence or absence of a level 3 driving automation; tire friction; braking forces; a turning radius limit; a weight of the subscribing vehicle; driver's abilities; or any combination thereof.

Clause 34. The processing device of any of clauses 30 to 33, wherein the driver assistance data is received by the subscribing vehicle based on a request from the subscribing vehicle or based on an update period.

Clause 35. The processing device of any of clauses 30 to 34, further comprising: means for identifying a current traffic segment in which the current location is located; and means for configuring parameters of an advanced driver assistance system (ADAS) or an automated driving systems (ADS) of the subscribing vehicle based on a current collective behavior assessment of the current traffic segment.

Clause 36. The processing device of clause 35, wherein the parameters correspond to: a level of driving aggressiveness; a required driver's engagement type or level; a sensitivity of an autonomous emergency braking system; or any combination thereof.

Clause 37. A non-transitory computer-readable medium storing computer-executable instructions that, when executed by a server device, cause the server device to: receive, from each reporting vehicle of one or more reporting vehicles interacting with one or more traffic segments, a corresponding set of parameters; determine an individual behavior assessment for reporting vehicle interacting with respective one of the one or more traffic segments based on the corresponding set of parameters; determine a collective behavior assessment for each traffic segment of the one or more traffic segments based on one or more individual assessments associated with the corresponding traffic segment and configuration information of the corresponding traffic segment; and transmit driver assistance data to a subscribing vehicle, the driver assistance data including at least the one or more collective behavior assessments of the one or more traffic segments.

Clause 38. The non-transitory computer-readable medium of clause 37, wherein the configuration information of the corresponding traffic segment comprises a direction of movement of the corresponding traffic segment, a lane pattern of the corresponding traffic segment, a geographic area that encompasses the corresponding traffic segment, or any combination thereof.

Clause 39. The non-transitory computer-readable medium of any of clauses 37 to 38, wherein the one or more collective behavior assessments correspond to one or more ratings selected from at least: a first candidate rating indicating that the corresponding traffic segment is recommended to be selected in a route planning process, and a second candidate rating indicating that the corresponding traffic segment is recommended to be avoided in the route planning process.

Clause 40. The non-transitory computer-readable medium of any of clauses 37 to 39, wherein the driver assistance data is transmitted to the subscribing vehicle based on a request from the subscribing vehicle or based on an update period.

Clause 41. The non-transitory computer-readable medium of any of clauses 37 to 40, wherein the set of parameters from a corresponding reporting vehicle comprises: a direction of movement; a speed limit compliance record; a time headway; a driver's engagement type or level; a count or a frequency of speeding, passing, and/or cutting movements; a count or a frequency of a jerk being greater than a jerk reference level and/or an acceleration being greater than an acceleration reference level; a count, a frequency, or a level of deviation from a center of a lane; a count or a frequency of engagements of emergency intervention by an advanced driver assistance system (ADAS); a sensing confidence level of the ADAS or an automated driving systems (ADS); a count or a frequency of a driver of the reporting vehicle taking over an operation of the reporting vehicle disregarding the ADAS or the ADS of the reporting vehicle that is in operation; an observed occurrence of cutting, speeding, or deviation of another vehicle; or any combination thereof.

Clause 42. A non-transitory computer-readable medium storing computer-executable instructions that, when executed by a processing device of a subscribing vehicle, cause the processing device to: receive driver assistance data including at least one or more collective behavior assessments of one or more traffic segments between a current location of the subscribing vehicle and a destination of the subscribing vehicle, the one or more collective behavior assessments being based on one or more individual behavior assessments of one or more reporting vehicles interacting with the one or more traffic segments; and engage in a route planning process to obtain a planned route from the current location to the destination based on the one or more collective behavior assessments of the one or more traffic segments.

Clause 43. The non-transitory computer-readable medium of clause 42, wherein the one or more collective behavior assessments correspond to one or more ratings selected from at least: a first candidate rating indicating that the corresponding traffic segment is recommended to be selected in the route planning process, and a second candidate rating indicating that the corresponding traffic segment is recommended to be avoided in the route planning process.

Clause 44. The non-transitory computer-readable medium of any of clauses 42 to 43, wherein the planned route includes a qualified traffic segment from the one or more traffic segments that the subscribing vehicle meets a set of requirements set forth for the corresponding collective behavior assessment of the qualified traffic segment, and the set of requirements corresponds to: capability information related to the subscribing vehicle; a driver's engagement type or level; a driver's preference setting; or any combination thereof.

Clause 45. The non-transitory computer-readable medium of clause 44, wherein the capability information related to the subscribing vehicle comprises: a type of the subscribing vehicle; presence or absence of an autonomous emergency braking system; a sensitivity level of the autonomous emergency braking system; presence or absence of a forward collision warning system; presence or absence of a level 2 driving automation; presence or absence of a level 3 driving automation; tire friction; braking forces; a turning radius limit; a weight of the subscribing vehicle; driver's abilities; or any combination thereof.

Clause 46. The non-transitory computer-readable medium of any of clauses 42 to 45, wherein the driver assistance data is received by the subscribing vehicle based on a request from the subscribing vehicle or based on an update period.

Clause 47. The non-transitory computer-readable medium of any of clauses 42 to 46, further comprising computer-executable instructions that, when executed by the processing device, cause the processing device to: identify a current traffic segment in which the current location is located; and configure parameters of an advanced driver assistance system (ADAS) or an automated driving systems (ADS) of the subscribing vehicle based on a current collective behavior assessment of the current traffic segment.

Clause 48. The non-transitory computer-readable medium of clause 47, wherein the parameters correspond to: a level of driving aggressiveness; a required driver's engagement type or level; a sensitivity of an autonomous emergency braking system; or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method of operating a server device, comprising:
   receiving, from each reporting vehicle of one or more reporting vehicles interacting with one or more traffic segments, a corresponding set of parameters indicating a likelihood of the reporting vehicle to engage in aggressive driving behavior;
   determining an individual behavior assessment for each vehicle interacting with respective one of the one or more traffic segments based on the corresponding set of parameters;
   determining a collective behavior assessment for each traffic segment of the one or more traffic segments based on one or more individual behavior assessments associated with the corresponding traffic segment and configuration information of the corresponding traffic segment; and transmitting driver assistance data to a subscribing vehicle, the driver assistance data including at least the one or more collective behavior assessments of the one or more traffic segments.

2. The method of claim 1, wherein the configuration information of the corresponding traffic segment comprises a direction of movement of the corresponding traffic segment, a lane pattern of the corresponding traffic segment, a geographic area that encompasses the corresponding traffic segment, or any combination thereof.

3. The method of claim 1, wherein the one or more collective behavior assessments correspond to one or more ratings selected from at least:

a first candidate rating indicating that the corresponding traffic segment is recommended to be selected in a route planning process, and a second candidate rating indicating that the corresponding traffic segment is recommended to be avoided in the route planning process.

4. The method of claim 1, wherein the set of parameters from a corresponding reporting vehicle comprises:

a direction of movement;

a speed limit compliance record;

a time headway;

a driver's engagement type or level;

a count or a frequency of speeding, passing, and/or cutting movements;

a count or a frequency of a jerk being greater than a jerk reference level and/or an acceleration being greater than an acceleration reference level;

a count, a frequency, or a level of deviation from a center of a lane;

a count or a frequency of engagements of emergency intervention by an advanced driver assistance system (ADAS);

a count or a frequency of a driver of the reporting vehicle taking over an operation of the reporting vehicle disregarding the ADAS or the ADS of the reporting vehicle that is in operation;

an observed occurrence of cutting, speeding, or deviation of another vehicle; or any combination thereof.

5. A method of operating a processing device of a subscribing vehicle, comprising:

receiving driver assistance data including at least one or more collective behavior assessments of one or more traffic segments between a current location of the subscribing vehicle and a destination of the subscribing vehicle, the one or more collective behavior assessments being based on one or more individual behavior assessments of one or more vehicles interacting with the one or more traffic segments, the one or more individual behavior assessments based on parameters indicating a likelihood of a reporting vehicle to engage in aggressive driving behavior; and engaging in a route planning process to obtain a planned route from the current location to the destination based on the one or more collective behavior assessments of the one or more traffic segments.

6. The method of claim 5, wherein the one or more collective behavior assessments correspond to one or more ratings selected from at least:

a first candidate rating indicating that the corresponding traffic segment is recommended to be selected in the route planning process, and a second candidate rating indicating that the corresponding traffic segment is recommended to be avoided in the route planning process.

7. The method of claim 5, wherein the planned route includes a qualified traffic segment from the one or more traffic segments that the subscribing vehicle meets a set of requirements set forth for the corresponding collective behavior assessment of the qualified traffic segment, and the set of requirements corresponds to:

capability information related to the subscribing vehicle;

a driver's engagement type or level;

a driver's preference setting; or any combination thereof.

8. The method of claim 7, wherein the capability information related to the subscribing vehicle comprises:

a type of the subscribing vehicle;

presence or absence of an autonomous emergency braking system;

a sensitivity level of the autonomous emergency braking system;

presence or absence of a forward collision warning system;

presence or absence of a level 2 driving automation;

presence or absence of a level 3 driving automation;

tire friction;

braking forces;

a turning radius limit;

a weight of the subscribing vehicle;

driver's abilities; or any combination thereof.

9. The method of claim 5, further comprising:

identifying a current traffic segment in which the current location is located; and configuring parameters of an advanced driver assistance system (ADAS) or an automated driving systems (ADS) of the subscribing vehicle based on a current collective behavior assessment of the current traffic segment.

10. The method of claim 9, wherein the parameters correspond to:

a level of driving aggressiveness;

a required driver's engagement type or level;

a sensitivity of an autonomous emergency braking system; or any combination thereof.

11. A server device, comprising:

one or more memories;

one or more transceivers; and one or more processors communicatively coupled to the one or more memories and the one or more transceivers, the one or more processors, either alone or in combination, configured to:

receive, via the one or more transceivers, from each reporting vehicle of one or more reporting vehicles interacting with one or more traffic segments, a corresponding set of parameters indicating a likelihood of the reporting vehicle to engage in aggressive driving behavior;

determine an individual behavior assessment for each vehicle interacting with respective one of the one or more traffic segments based on the corresponding set of parameters;

determine a collective behavior assessment for each traffic segment of the one or more traffic segments based on one or more individual behavior assessments associated with the corresponding traffic segment and configuration information of the corresponding traffic segment; and transmit, via the one or more transceivers, driver assistance data to a subscribing vehicle, the driver assistance data including at least the one or more collective behavior assessments of the one or more traffic segments.

12. The server device of claim 11, wherein the configuration information of the corresponding traffic segment comprises a direction of movement of the corresponding traffic segment, a lane pattern of the corresponding traffic segment, a geographic area that encompasses the corresponding traffic segment, or any combination thereof.

13. The server device of claim 11, wherein the one or more collective behavior assessments correspond to one or more ratings selected from at least:

a first candidate rating indicating that the corresponding traffic segment is recommended to be selected in a route planning process, and a second candidate rating indicating that the corresponding traffic segment is recommended to be avoided in the route planning process.

14. The server device of claim 11, wherein the set of parameters from a corresponding reporting vehicle comprises:

a direction of movement;

a speed limit compliance record;

a time headway;

a driver's engagement type or level;

a count or a frequency of speeding, passing, and/or cutting movements;

a count or a frequency of a jerk being greater than a jerk reference level and/or an acceleration being greater than an acceleration reference level;

a count, a frequency, or a level of deviation from a center of a lane;

a count or a frequency of engagements of emergency intervention by an advanced driver assistance system (ADAS);

a count or a frequency of a driver of the reporting vehicle taking over an operation of the reporting vehicle disregarding the ADAS or the ADS of the reporting vehicle that is in operation;

an observed occurrence of cutting, speeding, or deviation of another vehicle; or any combination thereof.

15. A processing device of a subscribing vehicle, comprising:

one or more memories;

one or more transceivers; and one or more processors communicatively coupled to the one or more memories and the one or more transceivers, the one or more processors, either alone or in combination, configured to:

receive, via the one or more transceivers, driver assistance data including at least one or more collective behavior assessments of one or more traffic segments between a current location of the subscribing vehicle and a destination of the subscribing vehicle, the one or more collective behavior assessments being based on one or more individual behavior assessments of one or more vehicles interacting with the one or more traffic segments, the one or more individual behavior assessments based on parameters indicating a likelihood of a reporting vehicle to engage in aggressive driving behavior; and engage in a route planning process to obtain a planned route from the current location to the destination based on the one or more collective behavior assessments of the one or more traffic segments.

16. The processing device of claim 15, wherein the one or more collective behavior assessments correspond to one or more ratings selected from at least:

a first candidate rating indicating that the corresponding traffic segment is recommended to be selected in the route planning process, and a second candidate rating indicating that the corresponding traffic segment is recommended to be avoided in the route planning process.

17. The processing device of claim 15, wherein the planned route includes a qualified traffic segment from the one or more traffic segments that the subscribing vehicle meets a set of requirements set forth for the corresponding collective behavior assessment of the qualified traffic segment, and the set of requirements corresponds to:

capability information related to the subscribing vehicle;

a driver's engagement type or level;

a driver's preference setting; or any combination thereof.

18. The processing device of claim 17, wherein the capability information related to the subscribing vehicle comprises:

a type of the subscribing vehicle;

presence or absence of an autonomous emergency braking system;

a sensitivity level of the autonomous emergency braking system;

presence or absence of a forward collision warning system;

presence or absence of a level 2 driving automation;

presence or absence of a level 3 driving automation;

tire friction;

braking forces;

a turning radius limit;

a weight of the subscribing vehicle;

driver's abilities; or any combination thereof.

19. The processing device of claim 15, wherein the one or more processors, either alone or in combination, are further configured to:

identify a current traffic segment in which the current location is located; and configure parameters of an advanced driver assistance system (ADAS) or an automated driving systems (ADS) of the subscribing vehicle based on a current collective behavior assessment of the current traffic segment.

20. The processing device of claim 19, wherein the parameters correspond to:

a level of driving aggressiveness;

a required driver's engagement type or level;

a sensitivity of an autonomous emergency braking system; or any combination thereof.

* * * * *